(12) United States Patent
Ball et al.

(10) Patent No.: US 11,655,000 B2
(45) Date of Patent: May 23, 2023

(54) MAGNETIC ENGAGEMENT MECHANISM FOR A RECREATIONAL AND/OR TRANSPORTATION APPARATUS

(71) Applicants: Smart Clips LLC, Sarasota, FL (US); Magswitch Technology, Inc., Lafayette, CO (US)

(72) Inventors: Steven Ball, Sarasota, FL (US); Shane Felton, Colgate, WI (US)

(73) Assignees: Smart Clips LLC, Sarasota, FL (US); Magswitch Technology, Inc., Lafayette, CO (US)

( * ) Notice: Subject to any disclaimer, the term of this patent is extended or adjusted under 35 U.S.C. 154(b) by 0 days.

(21) Appl. No.: 17/363,509

(22) Filed: Jun. 30, 2021

(65) Prior Publication Data

US 2021/0323634 A1    Oct. 21, 2021

Related U.S. Application Data

(63) Continuation-in-part of application No. 17/165,407, filed on Feb. 2, 2021, now Pat. No. 11,530,014, which
(Continued)

(51) Int. Cl.
*B62M 3/08* (2006.01)
*A43B 5/14* (2006.01)
*A43B 1/00* (2006.01)

(52) U.S. Cl.
CPC ........... *B62M 3/086* (2013.01); *A43B 1/0054* (2013.01); *A43B 5/14* (2013.01)

(58) Field of Classification Search
CPC ....... B62M 3/086; B62M 3/08; A43B 1/0054; A43B 5/14; H01F 7/04; H01F 7/0252
See application file for complete search history.

(56) References Cited

U.S. PATENT DOCUMENTS 3,537,719 A    11/1970  Gottfried
4,419,644 A    12/1983  Baermann
(Continued)

FOREIGN PATENT DOCUMENTS

CN         1762760 A    4/2006
CN       202022288 U   11/2011
(Continued)

OTHER PUBLICATIONS

International Search Report of the International Searching Authority dated Feb. 19, 2019, issued in connection with International Application No. PCT/US2018/63654 (3 pages).
(Continued)

*Primary Examiner* — Luis A Gonzalez
(74) *Attorney, Agent, or Firm* — McCarter & English, LLP

(57) ABSTRACT

Exemplary embodiments are directed to a pedal for a bicycle that includes a body, a spindle rotatably secured to the body and for connection with the bicycle, a first magnetic platter non-rotatably secured within the body, and a second magnetic platter rotatably secured within the body and overlaying the first magnetic platter. The first and second magnetic platters each include two magnetic blocks that are separated and magnetically charged by a respective permanent magnet plate positioned therebetween. The second magnetic platter includes a keyed protrusion configured to be engaged by a ferrous metal cleat, which can rotate the second magnetic platter between a first position where the pedal is in a magnetically inactive state and a second position where the pedal is in a magnetically active state magnetically securing the cleat to the second magnetic platter.

22 Claims, 20 Drawing Sheets

Related U.S. Application Data is a continuation of application No. 16/742,110, filed on Jan. 14, 2020, now Pat. No. 10,906,606, which is a continuation of application No. 16/208,158, filed on Dec. 3, 2018, now Pat. No. 10,532,791.

(60) Provisional application No. 62/594,830, filed on Dec. 5, 2017.

(56) References Cited

U.S. PATENT DOCUMENTS

| | | | |
|---|---|---|---|
| 5,473,963 | A | 12/1995 | Aeschbach |
| 5,704,256 | A | 1/1998 | De Lattre |
| 6,707,360 | B2 | 3/2004 | Underwood et al. |
| 7,102,476 | B1 | 9/2006 | Shen |
| 7,161,451 | B2 | 1/2007 | Shen |
| 8,350,663 | B1 | 1/2013 | Michael |
| 10,532,791 | B2 | 1/2020 | Ball |
| 10,906,606 | B2 | 2/2021 | Ball et al. |
| 11,130,547 | B2 | 9/2021 | Fowler |
| 2002/0105400 | A1 | 8/2002 | Underwood et al. |
| 2006/0232367 | A1 | 10/2006 | Shen |
| 2008/0040937 | A1 | 2/2008 | Champoux et al. |
| 2009/0288316 | A1 | 11/2009 | Fullerton et al. |
| 2010/0236095 | A1 | 9/2010 | Reed |
| 2010/0308549 | A1 | 12/2010 | Rivard |
| 2011/0248806 | A1 | 10/2011 | Michael |
| 2013/0269477 | A1 | 10/2013 | Williams |
| 2016/0304156 | A1 | 10/2016 | Pepito |
| 2017/0190381 | A1 | 7/2017 | Casey |
| 2017/0253295 | A1 | 9/2017 | Wu |
| 2019/0152559 | A1 | 5/2019 | Jentzsch |
| 2019/0168842 | A1 | 6/2019 | Ball |
| 2020/0148303 | A1 | 5/2020 | Ball et al. |
| 2020/0185137 | A1 | 6/2020 | Morton et al. |
| 2021/0129936 | A1 | 5/2021 | Fowler |

FOREIGN PATENT DOCUMENTS

| | | |
|---|---|---|
| CN | 103988267 A | 8/2014 |
| CN | 106585843 A | 4/2017 |
| EP | 1972221 A2 | 9/2008 |
| FR | 2719231 A1 | 11/1995 |
| KR | 20100094350 A | 8/2010 |
| KR | 20110078486 A | 7/2011 |
| KR | 20170044843 A | 4/2017 |

OTHER PUBLICATIONS

Written Opinion of the International Searching Authority dated Feb. 19, 2019, issued in connection with International Application No. PCT/US2018/63654 (4 pages).

Notice of Allowance dated Aug. 14, 2019, issued in connection with U.S. Appl. No. 16/208,158 (9 pages).

Notice of Allowance dated Jun. 15, 2020, issued in connection with U.S. Appl. No. 16/742,110 (8 pages).

Notice of Allowance dated Sep. 29, 2020, issued in connection with U.S. Appl. No. 16/742,110 (5 pages).

Office Action dated Jun. 3, 2021, along with an English translation, issued by the State Intellectual Property Office of People's Republic of China, issued in connection with Chinese Patent Application No. 201880088435.2 (12 pages).

Extended European Search Report dated Jun. 23, 2021, issued by the European Patent Office, issued in connection with European Patent Application No. 18885067.1 (6 pages).

International Search Report of the International Searching Authority dated Oct. 6, 2021, issued in connection with International Application No. PCT/US2021/39861 (3 pages).

Written Opinion of the International Searching Authority dated Oct. 6, 2021, issued in connection with International Application No. PCT/US2021/39861 (5 pages).

Office Action dated Apr. 12, 2022, issued in connection with U.S. Appl. No. 17/165,407 (8 pages).

Notice of Allowance dated Aug. 16, 2022, issued in connection with U.S. Appl. No. 17/165,407 (6 pages).

Communication Pursuant to Article 94(3) EPC dated Feb. 28, 2023, issued by the European Patent Office in connection with European Patent Application No. 18885067.1 (3 pages).

MAGNETIC ENGAGEMENT MECHANISM FOR A RECREATIONAL AND/OR TRANSPORTATION APPARATUS

CROSS-REFERENCE TO RELATED APPLICATIONS

This application is a Continuation-In-Part of, and claims priority to U.S. patent application Ser. No. 17/165,407, filed Feb. 2, 2021, which is a Continuation of, and claims priority to U.S. patent application Ser. No. 16/742,110, filed Jan. 14, 2020, and issued as U.S. Pat. No. 10,906,606 on Feb. 2, 2021, which is a Continuation of, and claims priority to, U.S. patent application Ser. No. 16/208,158, filed Dec. 3, 2018, and issued as U.S. Pat. No. 10,532,791 on Jan. 14, 2020, which claims the benefit of U.S. Provisional Patent Application No. 62/594,830, filed on Dec. 5, 2017. The entire content and disclosures of all of the above are expressly incorporated herein by reference.

TECHNICAL FIELD

The present disclosure relates to magnetic engagement mechanisms for recreational and/or transportation apparatuses, such as bicycles, skis, snowboards, etc., so as to engage the covering (e.g., a shoe) of an appendage (e.g., the foot) to the apparatus.

BACKGROUND

Users of recreational and/or transportation apparatuses, e.g., bicycles (indoor and outdoor), skis, and snowboards, are often secured to their respective apparatus while also being able to reliably disengage therefrom. In the case of a bicycle, "clipless" pedals are utilized which include clip-in pedals secured to the bicycle and a cleat attached to the bottom of each of the cyclist's shoes. "Clipless" pedals allow for the bicyclist to removably secure their shoes (and feet) to the bicycle pedals. The clip-in pedals can be spring loaded and permit the user to insert the cleat, depress the spring-loaded portion of the pedal, and secure the cleat to top plates of the pedal. By being clipped in, the cyclist will have increased power transfer through the pedal stroke, increased efficiency, and better control, among other benefits. However, when a cyclist wishes to stop they must unclip their shoe from the pedal instead of simply taking their feet off of the pedals. Additionally, if the cyclist is in an accident they will want to be able to unclip from the pedals quickly and effortlessly. To unclip and release the cleat from the pedal, the cyclist will generally twist their heel outwards until the cleat is released from the pedal. This unclipping process can at times be difficult and the cleat can become stuck in the pedal. In the case of an accident, the failure of a cleat to disengage a pedal can increase the risk or severity of an injury. Accordingly, what is needed is a "clipless" pedal that is secure but can also be easily and reliably disengaged.

Modular permanent magnet workpiece chucks are known in the art. For example, U.S. Pat. No. 7,161,451, which is hereby incorporated by reference in its entirety, discloses a permanent magnet chuck for holding or lifting workpieces. This type of chuck can include two magnetic layers that are stacked over one another and encased in a housing. Each of the magnetic layers are made up of a series of soft magnet blocks that are positioned about a center and divided by permanent magnet plates. That is, each magnetic layer comprises alternating soft magnetic blocks and permanent magnet plates. The magnetic layers can be, for example, square or circular shaped. If square shaped, the magnetic layers can contain an even number of soft magnet blocks, for example, two or four, that are shaped as cubes or rectangular prisms. If circular shaped, the magnetic layers can contain an even number of soft magnet blocks, for example, two, four, six, etc., that are shaped as circular sector prisms, e.g., extruded pie slices. The permanent magnet plates have two major faces that are positioned adjacent the interposed soft magnetic blocks. The first major face has a north magnetic polarity and the second major face, which is opposite the first major face, has a south magnetic polarity. The permanent magnet plates are positioned between adjacent soft magnetic blocks extending generally from the center of the magnetic layer to the perimeter, and such that each soft magnetic block is adjacent either only north magnetic faces or south magnetic faces of the two bordering permanent magnet plates, but not a north magnetic face and a south magnetic face. The soft magnetic blocks that are adjacent north magnetic faces will have a north polarity while the soft magnetic blocks that are adjacent south magnetic faces will have a south polarity. As a result, the soft magnetic blocks alternate between north polarity blocks and south polarity blocks, e.g., a first block has a north polarity, a second subsequent block has a south polarity, a third subsequent block has a north polarity, and so on. One of the magnetic layers can be connected to an external lug-nut that allows for the magnetic layer to be rotated by a tool, e.g., a wrench.

Each of the magnetic layers are configured as described above, and are placed on top of one another. The first and second magnetic layers can be overlapped in two different positions, an unaligned position and an aligned position. In the unaligned position, the polarity of the soft magnetic blocks of the first and second magnetic layers that overlap each other are of opposite polarity, e.g., the north polarity soft magnetic blocks of the first layer overlay the south polarity soft magnetic blocks of the second layer, and the south polarity soft magnetic blocks of the first layer overlay the north polarity soft magnetic blocks of the second layer. In this unaligned position, the magnetic flux lines are close-circuited, which prevents the magnetic force from extending beyond the first and second magnetic layers. As such, this unaligned position is known as a magnetically inactive state since the permanent magnet chuck will not exert a significant magnetic force on an external workpiece made of a ferromagnetic material. In the aligned position, the polarity of the soft magnetic blocks of the first and second magnetic layers that overlap each other are of the same polarity, e.g., the north polarity soft magnetic blocks of the first layer overlay the north polarity soft magnetic blocks of the second layer, and the south polarity soft magnetic blocks of the first layer overlay the south polarity soft magnetic blocks of the second layer. In this aligned position, the magnetic circuits are incomplete and open, allowing magnetic force to extend beyond the first and second magnetic layers. As such, this aligned position is known as a magnetically active state since the permanent magnet chuck will exert a magnetic force on an external workpiece made of a ferromagnetic material and thus secure the external workpiece to the permanent magnet chuck.

The permanent magnet chuck can be switched between the active and inactive positions by rotating one of the magnetic layers with respect to the other magnetic layer by using a tool to rotate the external lug-nut so that the polarity of the soft magnetic blocks is either aligned or unaligned. The degree of rotation to switch between positions is determined by the number of soft magnetic blocks. If four soft magnetic blocks are used then the first magnetic layer will have to be rotated 90° (e.g., one quarter of a full circle) with respect to the second magnetic layer to switch between active and inactive positions. If six soft magnetic blocks are used then the first magnetic layer will have to be rotated 60° (e.g., one sixth of a full circle) with respect to the second magnetic layer to switch between active and inactive positions.

The permanent magnet chuck as described above and in U.S. Pat. No. 7,161,451 is known to be implemented with a work-holding device used in machining operations, e.g., for grinders, lathes, and mills, and for material handling purposes. For work-holding applications, the permanent magnet chuck would hold a material that is being worked on, e.g., a piece of metal that is being lathed. However, the permanent magnet chuck of the prior art is not directed to magnetically securing the device or tool that is used to activate the permanent magnet chuck.

The present disclosure addresses the foregoing drawback and others by providing magnetic engagement mechanisms for recreational and/or transportation apparatuses, and/or by providing same that can be activated and de-activated by a user's foot or other appendage and releasably secures the user's foot or other appendage to the apparatus so that it can be quickly and reliably connected and disconnected through rotational activation of two magnetic platters.

SUMMARY

Example embodiments of the present disclosure relate to magnetic engagement mechanisms for recreational and/or transportation apparatuses, such as bicycles, skis, snowboards, etc.

More particularly, a magnetic engagement mechanism for transportation apparatuses is provided according to embodiments of the present disclosure. In some example embodiments, the magnetic engagement mechanism includes two magnetic platters that can be rotated with respect to one another between a first magnetically inactive position and a second magnetically active position for engaging a ferrous cleat.

In some example embodiments, a pedal for a bicycle includes a body, a spindle assembly rotatably secured to the body and configured to be connected to the bicycle, a first magnetic platter positioned and non-rotatably secured within the body, and a second magnetic platter positioned and rotatably secured within the body overlaying the first magnetic platter. The first magnetic platter includes at least two blocks and at least one permanent magnet plate having a magnetic north face and a magnetic south face. The at least one permanent magnet plate of the first magnetic platter is positioned between the at least two blocks with a first of the at least two blocks adjacent the magnetic north face and a second of the at least two blocks adjacent the magnetic south face, such that the at least one permanent magnet plate magnetizes the first of the at least two blocks with a magnetic north polarity and the second of the at least two blocks with a magnetic south polarity. The second magnetic platter includes at least two blocks, at least one permanent magnet plate having a magnetic north face and a magnetic south face, and a keyed protrusion configured to be engaged by a ferrous metal cleat. The at least one permanent magnet plate of the second magnetic platter is positioned between the at least two blocks with a first of the at least two blocks adjacent the magnetic north face and a second of the at least two blocks adjacent the magnetic south face, such that the at least one permanent magnet plate magnetizes the first of the at least two blocks with a magnetic north polarity and the second of the at least two sections with a magnetic south polarity. The second magnetic platter is rotatable by the ferrous metal cleat between a first position where the first of the at least two blocks of the second magnetic platter overlays the second of the at least two blocks of the first magnetic platter and the second of the at least two blocks of the second magnetic platter overlays the first of the at least two blocks of the first magnetic platter, and a second position where the first of the at least two blocks of the second magnetic platter overlays the first of the at least two blocks of the first magnetic platter and the second of the at least two blocks of the second magnetic platter overlays the second of the at least two blocks of the first magnetic platter. When the second magnetic platter is in the first position the pedal is in a magnetically inactive state and the cleat is not magnetically secured to the second magnetic platter. When the second magnetic platter is in the second position the pedal is in a magnetically active state and the cleat is magnetically secured to the second magnetic platter.

In accordance with embodiments of the present disclosure a pedal for a bicycle is provided that includes a body, a spindle assembly rotatably secured to the body and configured to be connected to the bicycle, a first magnetic platter positioned and non-rotatably secured within the body, and a second magnetic platter positioned and rotatably secured within the body overlaying the first magnetic platter. The first magnetic platter includes an even number of permanent magnet plates that each have a magnetic north face and a magnetic south face, and a plurality of blocks. At least one block of the plurality of blocks is positioned between each adjacent pair of permanent magnet plates, such that the permanent magnet plates magnetize each of the plurality of blocks with either a magnetic north polarity or a magnetic south polarity with adjacent blocks having opposite magnetic polarities. The second magnetic platter includes an even number of permanent magnet plates each having a magnetic north face and a magnetic south face, a plurality of blocks, and a keyed protrusion configured to be engaged by a ferrous metal cleat. At least one block of the plurality of blocks is positioned between each adjacent pair of permanent magnet plates, such that the permanent magnet plates magnetizes each of the plurality of blocks with either a magnetic north polarity or a magnetic south polarity with adjacent blocks having opposite magnetic polarities. The second magnetic platter is rotatable by the ferrous metal cleat between a first position where the magnetic south polarity blocks of the second magnetic platter overlay the magnetic north polarity blocks of the first magnetic platter and the magnetic north polarity blocks of the second magnetic platter overlay the magnetic south polarity blocks of the first magnetic platter, and a second position where the magnetic south polarity blocks of the second magnetic platter overlay the magnetic south polarity blocks of the first magnetic platter and the magnetic north polarity blocks of the second magnetic platter overlay the magnetic north polarity blocks of the first magnetic platter. When the second magnetic platter is in the first position the pedal is in a magnetically inactive state and the cleat is not magnetically secured to the second magnetic platter, and when the second magnetic platter is in the second position the pedal is in a magnetically active state and the cleat is magnetically secured to the second magnetic platter.

In accordance with additional embodiments of the present disclosure a magnetic engagement mechanism for a recreational and/or transportation apparatus is provided that includes a body, a first magnetic platter positioned and non-rotatably secured within the body, and a second magnetic platter positioned and rotatably secured within the body overlaying the first magnetic platter. The first magnetic platter includes an even number of permanent magnet plates that each have a magnetic north face and a magnetic south face, and a plurality of blocks. At least one block of the plurality of blocks is positioned between each adjacent pair of permanent magnet plates, such that the permanent magnet plates magnetize each of the plurality of blocks with either a magnetic north polarity or a magnetic south polarity with adjacent blocks having opposite magnetic polarities. The second magnetic platter includes an even number of permanent magnet plates each having a magnetic north face and a magnetic south face, a plurality of blocks, and a keyed protrusion configured to be engaged by a ferrous metal cleat. At least one block of the plurality of blocks is positioned between each adjacent pair of permanent magnet plates, such that the permanent magnet plates magnetizes each of the plurality of blocks with either a magnetic north polarity or a magnetic south polarity with adjacent blocks having opposite magnetic polarities. The second magnetic platter is rotatable by the ferrous metal cleat between a first position where the magnetic south polarity blocks of the second magnetic platter overlay the magnetic north polarity blocks of the first magnetic platter and the magnetic north polarity blocks of the second magnetic platter overlay the magnetic south polarity blocks of the first magnetic platter, and a second position where the magnetic south polarity blocks of the second magnetic platter overlay the magnetic south polarity blocks of the first magnetic platter and the magnetic north polarity blocks of the second magnetic platter overlay the magnetic north polarity blocks of the first magnetic platter. When the second magnetic platter is in the first position the magnetic engagement mechanism is in a magnetically inactive state and the cleat is not magnetically secured to the second magnetic platter, and when the second magnetic platter is in the second position the magnetic engagement mechanism is in a magnetically active state and the cleat is magnetically secured to the second magnetic platter.

In accordance with additional embodiments of the present disclosure, a pedal for a bicycle comprises a body, a spindle assembly rotatably secured to the body and configured to be connected to said bicycle, a first magnetic platter positioned and non-rotatably secured within the body, and a second magnetic platter positioned and rotatably secured within the body overlaying the first magnetic platter. The first magnetic platter includes a first magnetic block, a second magnetic block, and a first permanent magnet plate positioned between and separating the first and second magnetic blocks. The first permanent magnet plate magnetizes the first magnetic block with a magnetic north polarity and the second magnetic block with a magnetic south polarity. The second magnetic platter includes a third magnetic block, a fourth magnetic block, a second permanent magnet plate positioned between and separating the third and fourth magnetic blocks, and a keyed protrusion that is configured to be engaged by a ferrous metal cleat to rotate the second magnetic platter between a first position and a second position. The second permanent magnet plate magnetizes the third magnetic block with a magnetic north polarity and the fourth magnetic block with a magnetic south polarity. When the second magnetic platter is in the first position, the third magnetic block overlays the second magnetic block and the fourth magnetic block overlays the first magnetic block, thus placing the pedal in a magnetically inactive state. When the second magnetic platter is in the second position, the third magnetic block overlays the first magnetic block and the fourth magnetic block overlays the second magnetic block, thus placing the pedal in a magnetically active state whereby the cleat is magnetically secured to the second magnetic platter.

BRIEF DESCRIPTION OF THE DRAWINGS

The foregoing features of the invention will be apparent from the following Detailed Description, taken in connection with the accompanying drawings, in which:

FIG. 24 is a top perspective view of a first magnetic platter of the pedal of FIG. 21.

DETAILED DESCRIPTION

The present disclosure relates to magnetic engagement mechanisms for recreational and/or transportation apparatuses, as discussed in detail below in connection with FIGS. 1-25.

Figure 1:
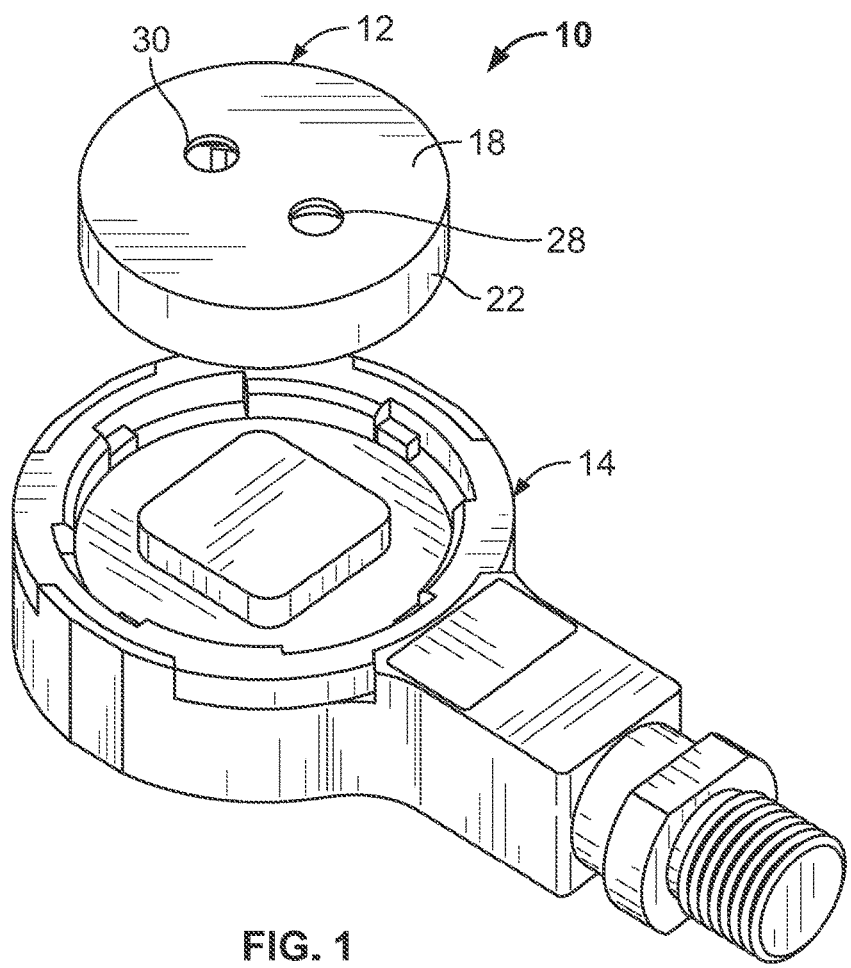
FIG. 1 is an exploded perspective view of a magnetic engagement mechanism for a transportation apparatus.
Figure 2:
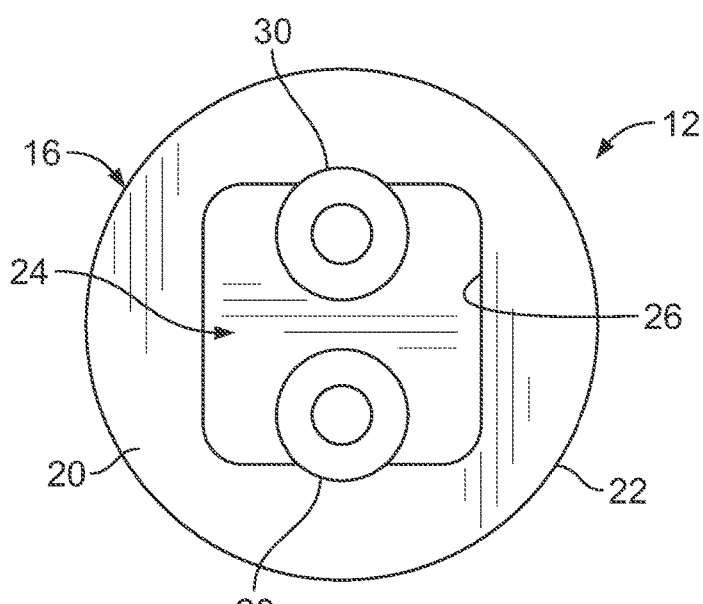
FIG. 2 is a bottom view of a cleat of the magnetic engagement mechanism of FIG. 1.
Figure 3:
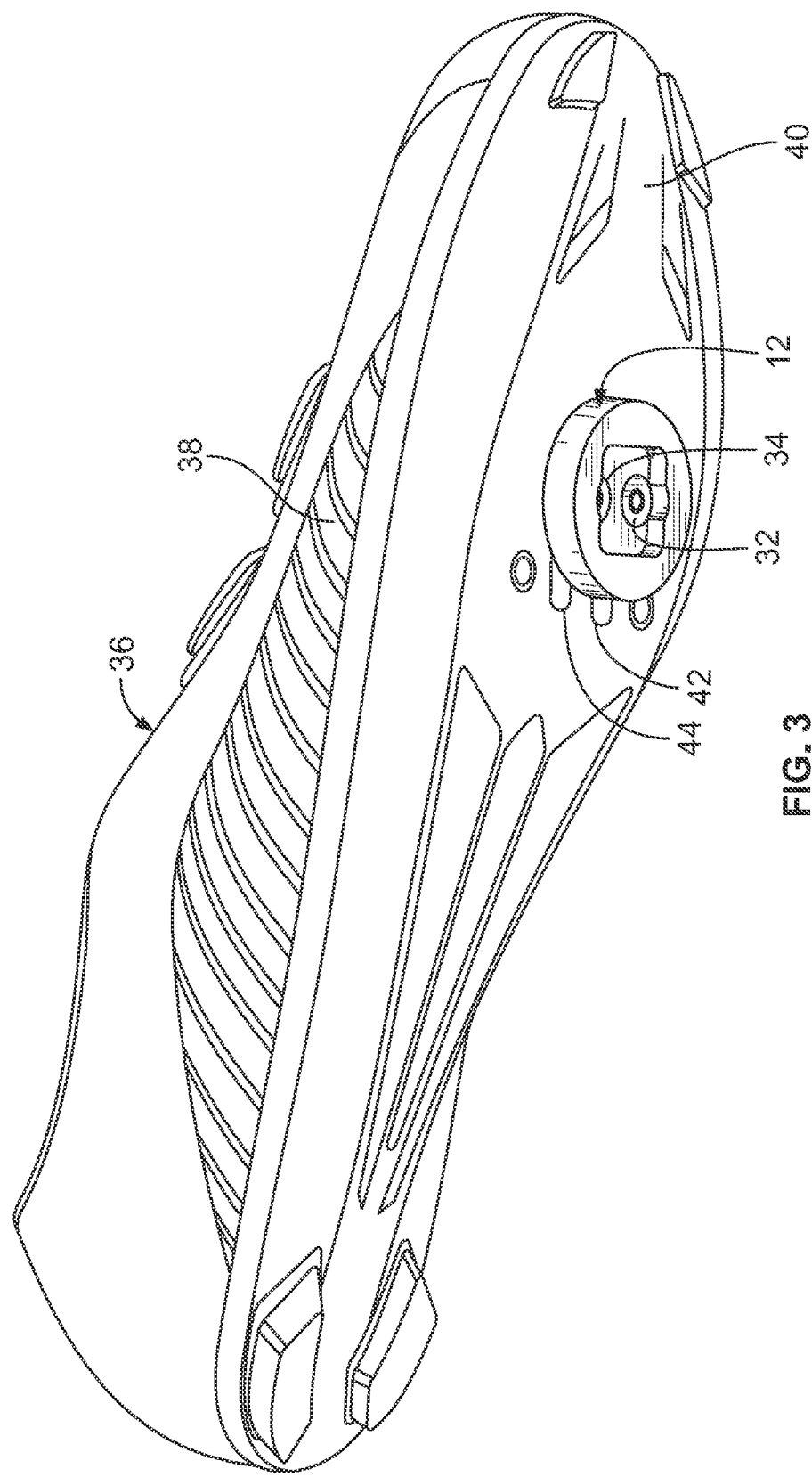
FIG. 3 is a perspective view of the cleat of FIG. 2 secured to a shoe.
Figure 4:
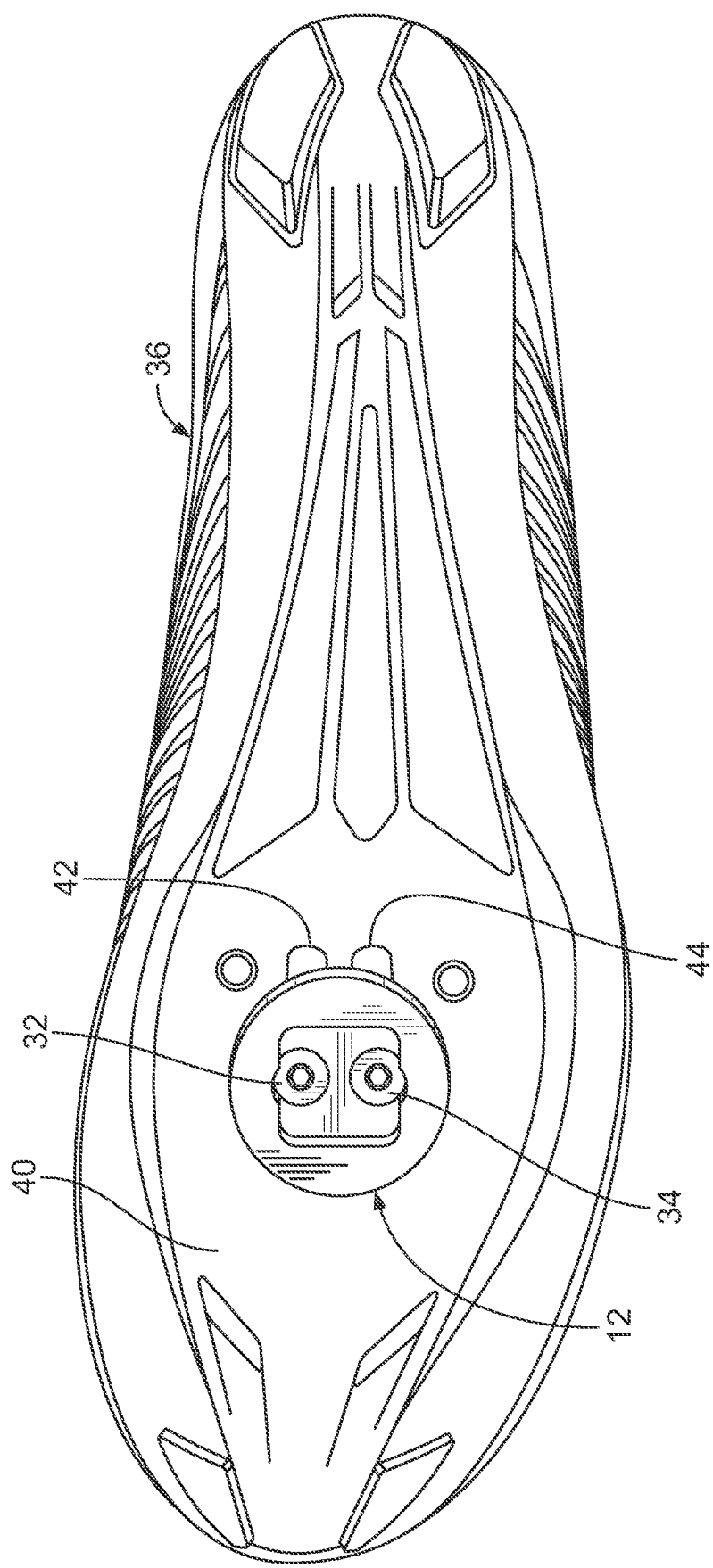
FIG. 4 is a bottom view of the cleat of FIG. 2 secured to a shoe.

FIG. 1 is a perspective view of a magnetic engagement mechanism 10 for a transportation apparatus, e.g., a bicycle (indoor or outdoor), skis, a snowboard, etc. The magnetic engagement mechanism 10 includes a cleat 12 and a pedal 14. FIG. 2 is a bottom view of the cleat 12. The cleat 12 includes a body 16 having a top surface 18, a bottom surface 20, and an outer perimeter wall 22. The body 16 can be generally cylindrical in shape. The body 16 additionally includes a keyed recess 24 defined by a keyed perimeter 26. The keyed recess 24 extends into the body 16 from the bottom surface 20. The keyed recess 24 is configured to engage a portion of the pedal 14, discussed in greater detail below. The body 16 additionally includes two holes 28, 30 that extend through the body 16. The holes 28, 30 can be positioned in the recess 24, as shown in FIG. 2, and extend through the top surface 18, or they can be positioned outside of the recess 24 and extend from the bottom surface 20 to the top surface 18. The holes 28, 30 allow for screws 32, 34 (see FIGS. 3 and 4) to be inserted therethrough to secure the cleat 12 to a shoe 36 and prevent rotation relative thereto, as shown in FIGS. 3 and 4. The holes 28, 30 can have a tapered wall so that the screw heads lay flush. The cleat 12 is shown with two holes 28, 30, however, it should be understood that the cleat 12 can include any number of holes desired that will allow the cleat 12 to be secured to the shoe 36. Use is also contemplated of other suitable means for securing the cleat to a shoe, boot, or other appendage covering.

FIGS. 3 and 4 are perspective and bottom views, respectively, showing the cleat 12 secured to the shoe 36. The shoe 36 can be a standard cycling shoe that includes an upper 38 and a sole 40. The sole 40 can be made of a rigid material, e.g., a hard plastic, and can include first and second tracks 42, 44. The first and second tracks 42, 44 allow the screws 32, 34 to be secured thereto at various positions along the length thereof, thus allowing the cleat 12 to be secured to the shoe 36 at different positions as desired. For example, the tracks 42, 44 can include a trapped nut (not shown) that can slide within the tracks 42, 44 and which can be engaged by the screws 32, 34.

Figure 5:
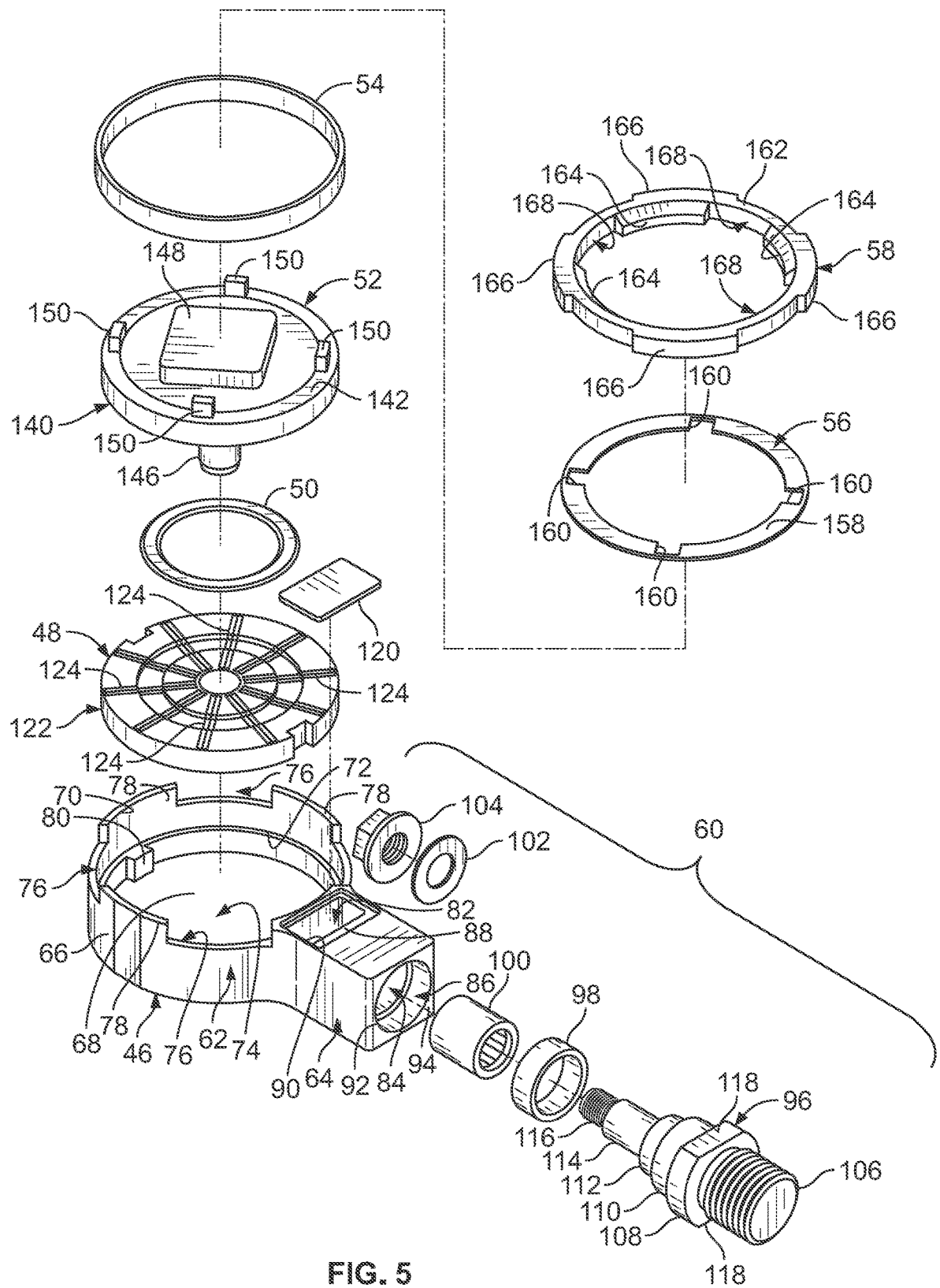
FIG. 5 is an exploded view of a pedal of the magnetic engagement mechanism of FIG. 1.
Figure 6:
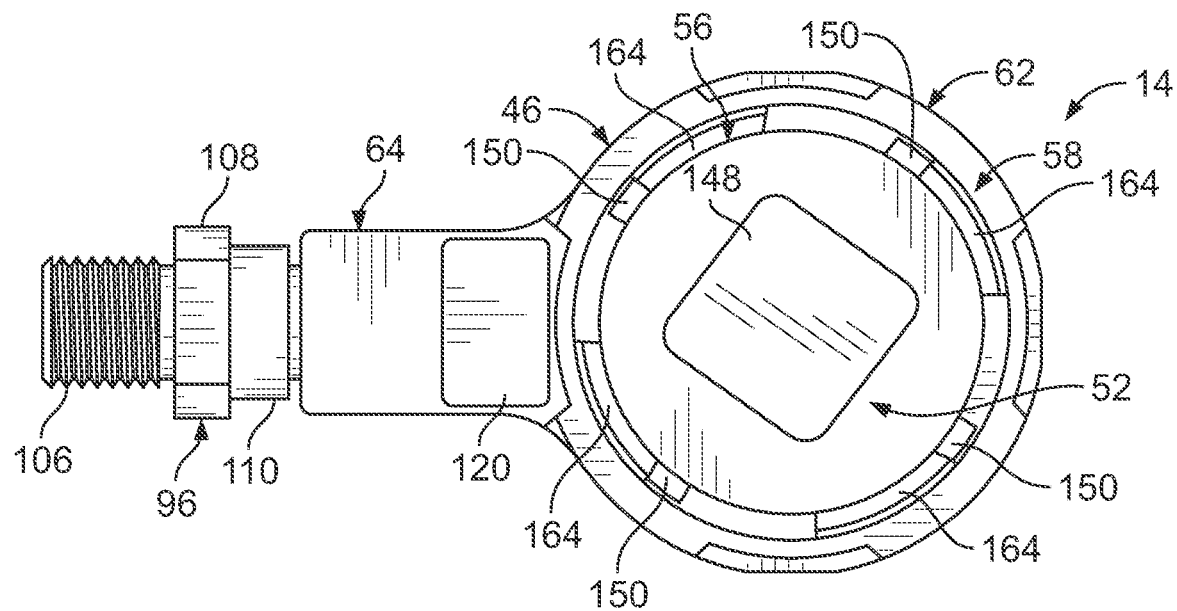
FIG. 6 is a top view of the pedal of FIG. 5.
Figure 7:
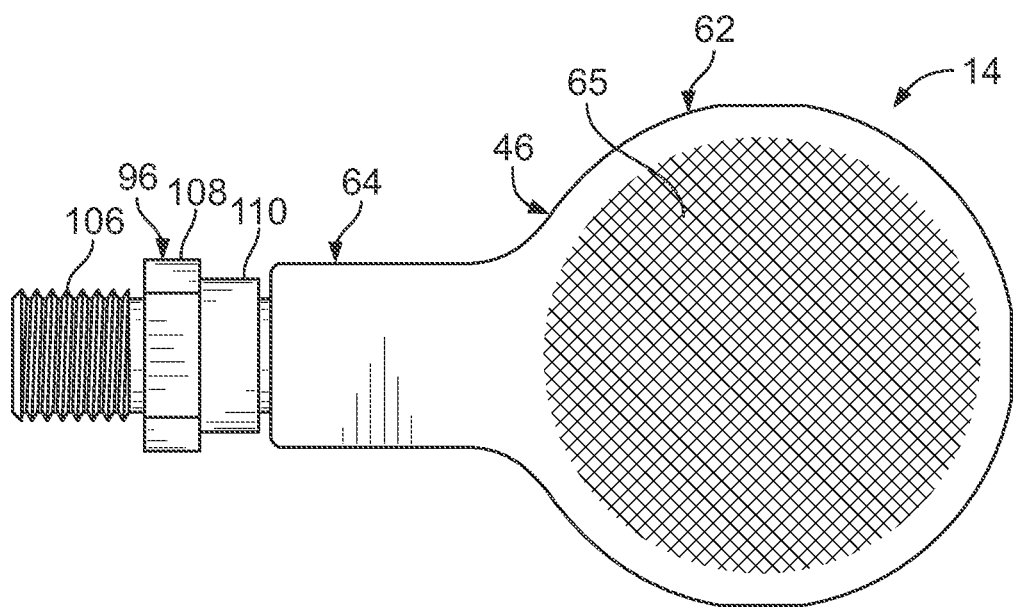
FIG. 7 is a bottom view of the pedal of FIG. 5.

FIG. 5 is an exploded view of the pedal 14. The pedal 14 includes a body 46, a first magnetic platter 48, an annular platter bushing 50, a second magnetic platter 52, an annular platter bushing 54, a top disc 56, a platter retention ring 58, and a spindle assembly 60. The body 46 includes a platter holder 62 and a stem 64. The body 46 can be unitary in nature such that it is formed from a single piece of material to increase strength and rigidity. FIGS. 6 and 7 are respectively top and bottom views of the pedal 14. As shown in FIG. 7, the back of the body 46 can include texturing 65, e.g., knurling, that allows a user to more securely engage the pedal 14 when they are wearing regular shoes or do not desire to magnetically lock their shoes 36 to the pedal 14.

As shown in FIG. 5, the platter holder 62 includes an annular sidewall 66, a bottom wall 68, a top opening 70, and an inner annular shoulder 72. The platter holder 62 defines an inner chamber 74 for housing the first magnetic platter 48, the annular platter bushing 50, the second magnetic platter 52, the annular platter bushing 54, and the top disc 56. The annular sidewall 66 includes a plurality of removed sections 76 adjacent the top opening 70 that form a plurality of abutments 78. The removed sections 76 are configured to receive a portion of the platter retention ring 58 while the abutments 78 are configured to prevent the platter retention ring 58 from rotating, discussed in greater detail below. The annular shoulder 72 includes one or more keys 80 that extend radially inward therefrom and are configured to engage the first magnetic platter 48 to prevent the first magnetic platter 48 from rotating relative to the platter holder 62.

The stem 64 defines an inner chamber 82, a bearing channel 84, and a bushing channel 86. The bearing channel 84 is generally smaller in diameter than the bushing channel 86. The stem 64 also includes a cover recess 88, an access opening 90 adjacent the cover recess 88, and a spindle opening 92, which is generally at a front face 94 of the stem 64 and adjacent the bushing channel 86 that is adjacent the bearing channel 84. The access opening 90 and the spindle opening 92 provide access to the inner chamber 82 and allow components of the spindle assembly 60 to be inserted into and positioned within the inner chamber 82, bearing channel 84, and bushing channel 86 of the stem 64.

The spindle assembly 60 includes a spindle 96, a bushing 98, a bearing 100, a washer 102, and a nut 104. The spindle 96 comprises a series of concentric components including a threaded outer extension 106, a head 108, a stop/spacer 110, a bushing mount 112, a bearing mount 114, and a threaded inner extension 116. The threaded outer extension 106 extends outwardly from the head 108 and is therefore positioned at the outer end of the spindle 96. The threaded outer extension 106 includes threading, e.g., 9/16"×20 tpi, configured to removably engage a threaded hole of a bicycle crankset crank arm. The head 108 is adjacent the threaded outer extension 106 and includes flattened sides 118 that can be engaged by a wrench or other tool to rotate the spindle 96, which assists in securing and tightening the threaded outer extension 106 to the threaded hole of a bicycle crankset crank arm. The stop/spacer 110 is a cylindrical component that extends from the head 108 opposite the threaded outer extension 106. The stop/spacer 110 is configured to engage the front face 94 of the stem 64 and prevent the spindle 96 from further insertion when the spindle 96 is engaged with the stem 64. Additionally, the stop/spacer 110 spaces the head 108 away from the stem 64 so that sufficient space is provided for the head 108 to be easily engaged by a tool. The bushing mount 112 is cylindrical in shape and extends from the stop/spacer 110 on the opposite side of the head 108. The bushing mount 112 has a smaller diameter than the stop/spacer 110 and is configured to be inserted into and surrounded by the bushing 98. That is, the bushing mount 112 is inserted into the bushing 98 and the bushing 98 is secured to the bushing mount 112, e.g., through a friction fit. The bearing mount 114 is also cylindrical in shape and extends from the bushing mount 112 on the opposite side of the stop/spacer 110. The bearing mount 114 has a smaller diameter than the bushing mount 112 and is configured to be inserted into and surround by the bearing 100. That is, the bearing mount 114 is inserted into the bearing 100 and the bearing 100 is secured to the bearing mount 114, e.g., through a friction fit. The threaded inner extension 116 is also cylindrical in shape and extends from the bearing mount 114 on the opposite side of the bushing mount 112. The threaded inner extension 116 includes threads that are configured to be engaged by the nut 104 to secure the spindle 96 to the stem 64.

The bushing 98 is configured to be inserted into and secured within the bushing channel 86 of the stem 64. The bushing 98 can be made of brass and reduces friction. As discussed, the bushing 98 is configured to receive and engage the bushing mount 112 of the spindle 96. The bearing 100 is configured to be inserted into and secured within the bearing channel 84 of the stem 64. The bearing 100 can be a needle roller bearing that allows a component on the interior thereof, e.g., the bearing mount 114 and therefore the spindle 96, to rotate while an outer ring of the bearing 100 is rotationally constrained. As discussed, the bearing 100 is configured to receive and engage the bearing mount 114 of the spindle 96 such that the spindle 96 can rotate within the bearing 100. When the bearing 100 is secured within the bearing channel 84 and the bushing 98 is secured within the bushing channel 86, the spindle 96 can be inserted through the spindle opening 92, the bushing 98, and the bearing 100 until the stop/spacer 110 contacts the front face 94 of the stem 64. When the spindle 96 is fully inserted, the bushing mount 112 will be surrounded by the bushing 98, the bearing mount 114 will be surrounded by the bearing 100, and the threaded inner extension 116 will be within the inner chamber 82 of the stem 64. The washer 102 and the nut 104 can then be inserted into the inner chamber 82 through the access opening 90 and placed over the threaded inner extension 116. The nut 104 can then be engaged with the threaded inner extension 116. The nut 104 can then be engaged by a tool, e.g., a wrench, and the head 108 can be engaged by a separate tool to tighten the nut 104 onto the threaded inner extension 116 of the spindle 96 to secure the spindle 96 to the stem 64. The washer 102 can be formed of polytetrafluoroethylene (PTFE) and used to reduce friction.

A cover 120 can be provided that can be positioned within the cover recess 88 and conceal the access opening 90. The cover 120 can be removably secured within the cover recess 88 such that it is flush with the outer walls of the stem 64, allowing a user to access the inner chamber 82 of the stem 64 when desired. For example, a user can remove the cover 120 to remove or replace the spindle 96, the bushing 98, or the bearing 100, or to grease the bearing 100.

Figure 8:
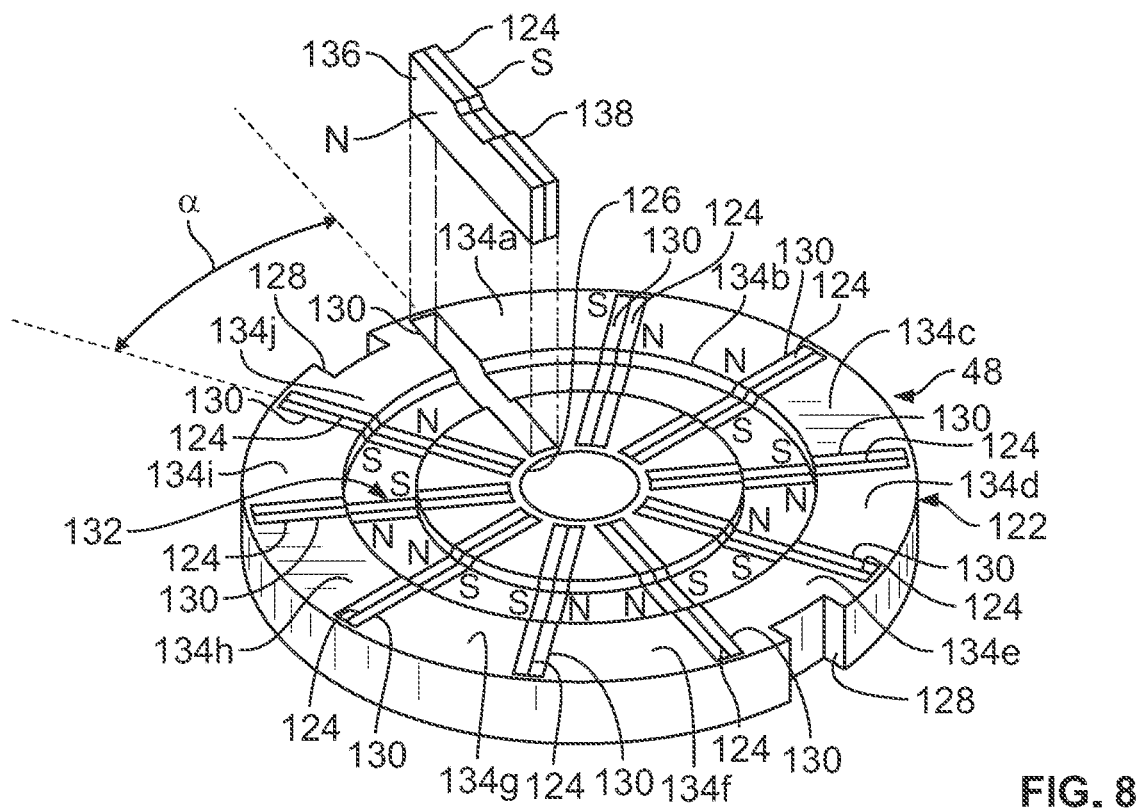
FIG. 8 is a top perspective view of a first magnetic platter of the pedal.

Turning to FIG. 8, a top perspective view of the first magnetic platter 48 is provided. The first magnetic platter 48 is generally circular in shape and includes a soft magnetic body 122 formed of a soft magnetic material, e.g., low carbon steel, and a plurality of permanent magnet plates 124. The soft magnetic body 122 includes a central hole 126, one or more peripheral notches 128, a plurality of radial slots 130, and an annular recess 132 configured to receive the annular platter bushing 50. The peripheral notches 128 extend radially inward from the outer perimeter of the soft magnetic body 122 and are configured to engage the keys 80 of the annular shoulder 72 of the platter holder 62. More specifically, the first magnetic platter 48 is sized and configured to be placed within the platter holder 62 and surrounded by the annular shoulder 72. When the first magnetic platter 48 is placed within the platter holder 62, the keys 80 engage the peripheral notches 128 and prevent the first magnetic platter 48 from rotating within the platter holder 62.

The plurality of radial slots 130 extend generally from the central hole 126 to the outer perimeter of the soft magnetic body 122 and are spaced from adjacent radial slots 130 by an angle α. Each of the radial slots 130 is spaced the same angle from adjacent radial slots 130, angle α, thus dividing the soft magnetic body 122 into an even number of equal sized soft-magnet blocks 134a-j. The embodiment shown in FIG. 8 has ten (10) radial slots 130, and ten (10) equally sized soft-magnet blocks 134a-j, which can be described as circular sector prisms in shape, are provided angularly spaced from each other by 36°. However, it should be understood that any even number of radial slots 130 can be utilized and are contemplated by this disclosure. For example, twelve (12) radial slots can be provided, which would result in twelve (12) equally sized blocks angularly spaced from each other by 30°, or, alternatively, fourteen (14) radial slots can be provided, which would result in fourteen (14) equally sized blocks angularly spaced from each other by approximately 25.71°. Sixteen, eighteen, twenty, etc., radial slots and equally sized blocks are also contemplated herein. The present disclosure further contemplates a preferred angle α being in the range of 20°-30°. In a preferred embodiment, the first magnetic platter 48 includes eighteen (18) radial slots 130 that are angularly spaced from each other by an angle α of 20°.

Each of the radial slots 130 is sized and configured to receive a permanent magnet plate 124. In a preferred embodiment where there are eighteen (18) radial slot 120, there will be eighteen (18) matching permanent magnet plates 124. Each permanent magnet plate 124 includes a first major face 136 and a second major face 138 opposite the first major face. The first major face 136 has either a north magnetic polarity or a south magnetic polarity while the second major face 138 has the opposite magnetic polarity, e.g., a south magnetic polarity if the first major face 136 has a north magnetic polarity or a north magnetic polarity if the first major face 136 has a south magnetic polarity. The permanent magnet plates 124 are positioned within the plurality of radial slots 130 so that major faces of the same magnetic polarity are facing each other and into the same soft-magnet block 134a-j such that each soft-magnet block 134a-j is adjacent either only north magnetic faces or only south magnetic faces of the bordering permanent magnet plates 124, but not a north magnetic face and a south magnetic face. The north and south magnetic faces of each permanent magnet plate 124 are labelled as "N" and "S" in FIG. 8 for illustrative purposes. When in such a configuration, the soft-magnet blocks 134b, 134d, 134f, 134h, 134j that are adjacent north magnetic faces will have a north polarity while the soft-magnet blocks 134a, 134c, 134e, 134g, 134i that are adjacent south magnetic faces will have a south polarity. As a result, the soft-magnet blocks 134a-j alternate between north polarity blocks and south polarity blocks.

Figure 9:
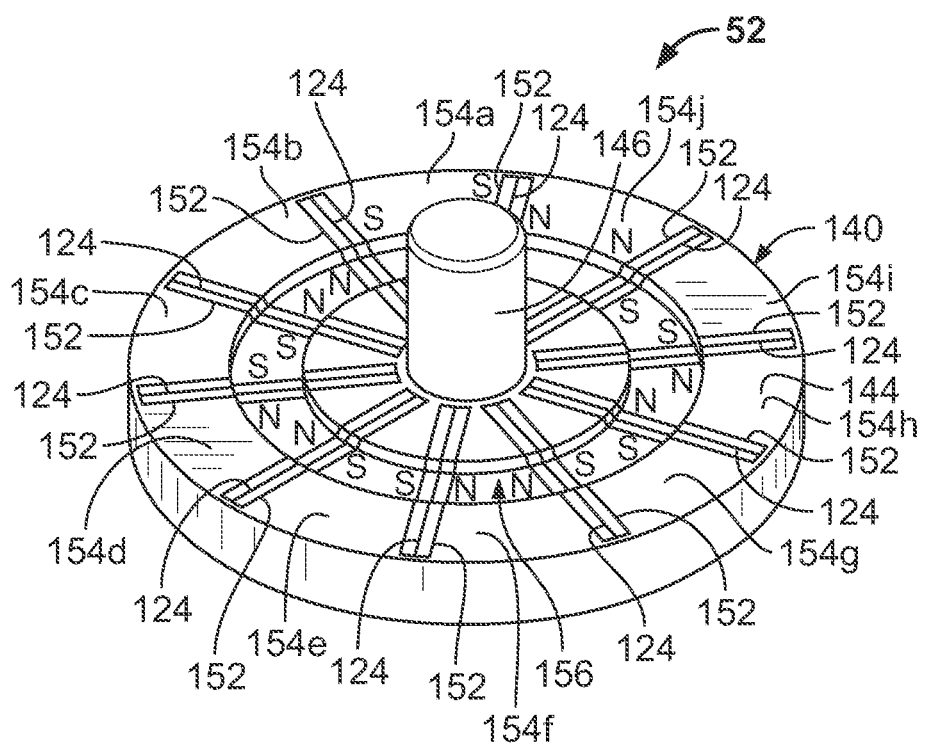
FIG. 9 is a bottom perspective view of a second magnetic platter of the pedal.

FIG. 9 is a bottom perspective view of the second magnetic platter 52, while FIG. 5 illustrates the second magnetic platter 52 from a top perspective view. The second magnetic platter 52 is generally circular in shape and includes a soft magnetic body 140 and a plurality of the permanent magnet plates 124. The soft magnetic body 140 has a top surface 142 and a bottom surface 144, and is formed of the same soft magnetic material, e.g., low carbon steel, as the soft magnetic body 122 of the first magnetic platter 48. The second magnetic platter 52 is similar in construction to the first magnetic platter 48, but with some additional components. The second magnetic platter 52 includes a central dowel pin 146, a keyed protrusion 148, and a plurality of blocks 150. The central dowel pin 146 extends from the center of the bottom surface 144 and is configured to be inserted into the central hole 126 of the first magnetic platter 48. The central dowel pin 146 can be constructed of stainless steel, for example. The keyed protrusion 148 extends from the center of the top surface 142 of the second magnetic platter 52. The keyed protrusion 148 has a matching shape to that of the keyed recess 24 of the cleat 12 so that it can be inserted into and received by the keyed recess 24. This keyed or mating configuration allows the cleat 12 to rotate the second magnetic platter 52 relative to the first magnetic platter 48 when the keyed protrusion 148 is received by the keyed recess 24. The keyed protrusion 148 is shown with a square configuration, though it is contemplated by the present disclosure that the keyed protrusion 148 and keyed recess 24 could have any matching geometry that allows the cleat 12 to rotate the second magnetic platter 52 when the keyed protrusion 148 is received by the keyed recess 24. For example, the keyed protrusion 148 and the keyed recess 24 could be triangular, pentagonal, star-shaped, etc. The plurality of blocks 150 extend from the top surface 142 of the second magnetic platter 52 and are equidistantly spaced generally along the perimeter of the second magnetic platter 52.

As referenced above, the second magnetic platter 52 is similar in construction to the first magnetic platter 48. Particularly, the second magnetic platter 52 includes a plurality of radial slots 152 that extend generally from the central dowel pin 146 to the outer perimeter of the soft magnetic body 140 and are spaced from adjacent radial slots 152 by angle α. Each of the radial slots 152 is spaced the same angle from adjacent radial slots 152, angle α, thus dividing the soft magnetic body 1140 into an even number of equal sized soft-magnet blocks 154a-j. The number of radial slots 152 and soft-magnet blocks 154a-j of the second magnetic platter 52 should match the number of radial slots 130 and soft-magnet blocks 134a-j of the first magnetic platter 48.

Each of the radial slots 152 is sized and configured to receive one of the permanent magnet plates 124, as described above. As with the first magnetic platter 48, the permanent magnet plates 124 are positioned within the plurality of radial slots 152 of the second magnetic platter 52 so that major faces of the same magnetic polarity are facing each other and into the same soft-magnet block 154a-j such that each soft-magnet block 154a-j is adjacent either only north magnetic faces or only south magnetic faces of the bordering permanent magnet plates 124, but not a north magnetic face and a south magnetic face. The north and south magnetic faces of each permanent magnet plate 124 are labelled as "N" and "S" in FIG. 8 for illustrative purposes. When in such a configuration, the soft-magnet blocks 154b, 154d, 154f, 154h, 154j that are adjacent north magnetic faces will have a north polarity while the soft-magnet blocks 154a, 154c, 154e, 154g, 154i that are adjacent south magnetic faces will have a south polarity. As a result, the soft-magnet blocks 154a-j alternate between north polarity blocks and south polarity blocks.

The second magnetic platter 52 also has an annular recess 156 extending into the bottom surface 144 and configured to receive the annular platter bushing 50. Particularly, when the first magnetic platter 48 is positioned and secured within the platter holder 62, the bushing 50 can then be placed in the annular recess 132 and the second magnetic platter 52 can then be placed over the first magnetic platter 48 with the central dowel pin 146 being inserted into the central hole 126 of the first magnetic platter 48. The bushing 50 will then be positioned between the first and second magnetic platters 48, 52 and within the annular recesses 132, 156. Thus, the bushing 50 spaces the first and second magnetic platters 48, 52 apart with second magnetic platter 52 riding on the bushing 50. The bushing 50 reduces friction when the second magnetic platter 52 is rotated. The bushing 50 can be made of brass, PTFE, or any other desired material that reduces friction.

Referring back to FIG. 5, the annular platter bushing 54 is cylindrical in shape, and sized and configured to be positioned about the circumference of the second magnetic platter 52 and within the platter holder 62. When the annular platter bushing 54 is positioned within the platter holder 62 it is supported by the inner annular shoulder 72. The annular platter bushing 54 centers the second magnetic platter 52 and reduces friction when the second magnetic platter 52 rotates. The annular platter bushing 54 be made of PTFE, brass, or any other desired material that reduces friction.

The top disc 56 includes an annular body 158 having a plurality of cut-outs 160. The top disc 56 is configured to be placed over the second magnetic platter 52 with the plurality of blocks 150 positioned within the cut-outs 160. As such, the cut-outs 160 are orientated and sized to match the plurality of blocks 150 that extend from the second magnetic platter 52 so that when the top disc 56 is placed over the second magnetic platter 52 each of the plurality of blocks 150 is positioned within one of the cut-outs 160 and the top disc 56 lies on the top surface 142 of the second magnetic platter 52. The top disc 56 reduces friction between the second magnetic platter 52 and the platter retention ring 58 when the second magnetic platter 52 is rotated. The top disc 56 can be made of PTFE, brass, or any other desired material that reduces friction.

The platter retention ring 58 includes a ring-shaped body 162 having a plurality of stops 164 that extend radially inward and a plurality of locking tabs 166 that extend radially outward. The top edge of the plurality of stops 164 can also be chamfered, which assists with centering and insertion of the cleat 12 during use. The locking tabs 166 are sized and spaced about the circumference of the ring-shaped body 162 to match the removed sections 76 of the platter holder 62. As such, the platter retention ring 58 is configured to be placed over the top disc 56 and the second magnetic platter 52 with the locking tabs 166 positioned and secured within the removed sections 76 of the platter holder 62. When the locking tabs 166 are positioned within the removed sections 76 of the platter holder 62, the platter retention ring 58 is prevented from rotating and secured in placed. The platter retention ring 58 can also be permanently secured to the platter holder 62 through a fastening means such as an adhesive or through welding. The platter retention ring 58, when secured to the platter holder 62, locks the second magnetic platter 52, the bushing 50, and the first magnetic platter 48 within the platter holder 62 so that they are axially constrained, but permits the second magnetic platter 52 to rotate with respect to the first magnetic platter 48 when engaged by the cleat 12.

Each of the plurality of stops 164 of the platter retention ring 58 are separated from an adjacent stop 164 by a gap 168. The gaps 168 are configured to receive the blocks 150 of the second magnetic platter 52 so that when the second magnetic platter 52 is rotated the blocks 150 ride within the gaps 168. Continued rotation of the second magnetic platter 52 results in the blocks 150 contacting the stops 164, which prevent the second magnetic platter 52 from further rotation. Accordingly, the stops 164 set the angular rotation of the second magnetic platter 52, and are therefore sized and spaced so that the second magnetic platter 52 can only be rotated by angle α, e.g., the angle that the permanent magnet plates 124 are from adjacent permanent magnet plates 124 as discussed in connection with FIGS. 8 and 9. Any attempt to rotate the second magnetic platter 52 further is prevented by the stops 164 engaging the blocks 150. Therefore, the stops 164 can be positioned to only allow 36° of rotation (e.g., for 10 plates), 30° of rotation (e.g., for 12 plates), 20° of rotation (e.g., for 18 plates), etc., depending on the number of permanent magnet plates 124. This configuration allows the second magnetic platter 52 to be rotated between a first position (e.g., an unaligned magnetically inactive position) and a second position (e.g., an aligned magnetically active position). In a preferred embodiment, the first magnetic platter 48 and the second magnetic platter 52 each include eighteen (18) permanent magnet plates 124, which require a preferred rotational angle of 20° for activation and deactivation.

Figure 10A:
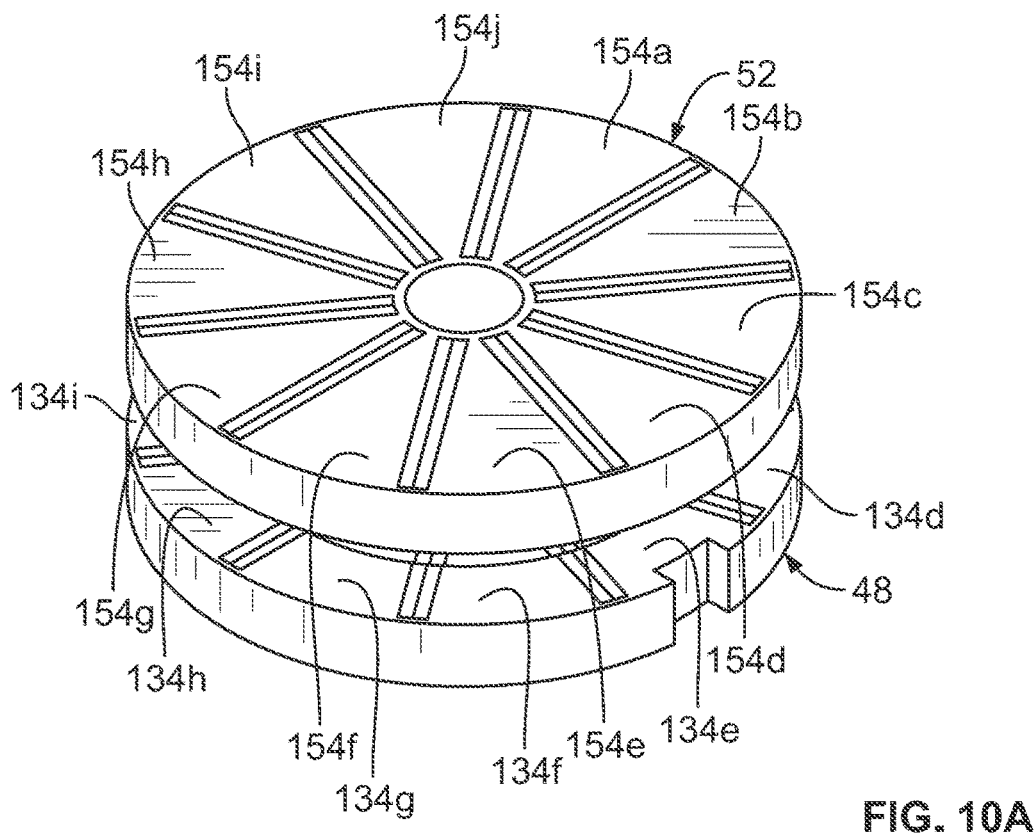
FIG. 10A is a partial perspective view of the second magnetic platter placed over the first magnetic platter in a first position.
Figure 10B:
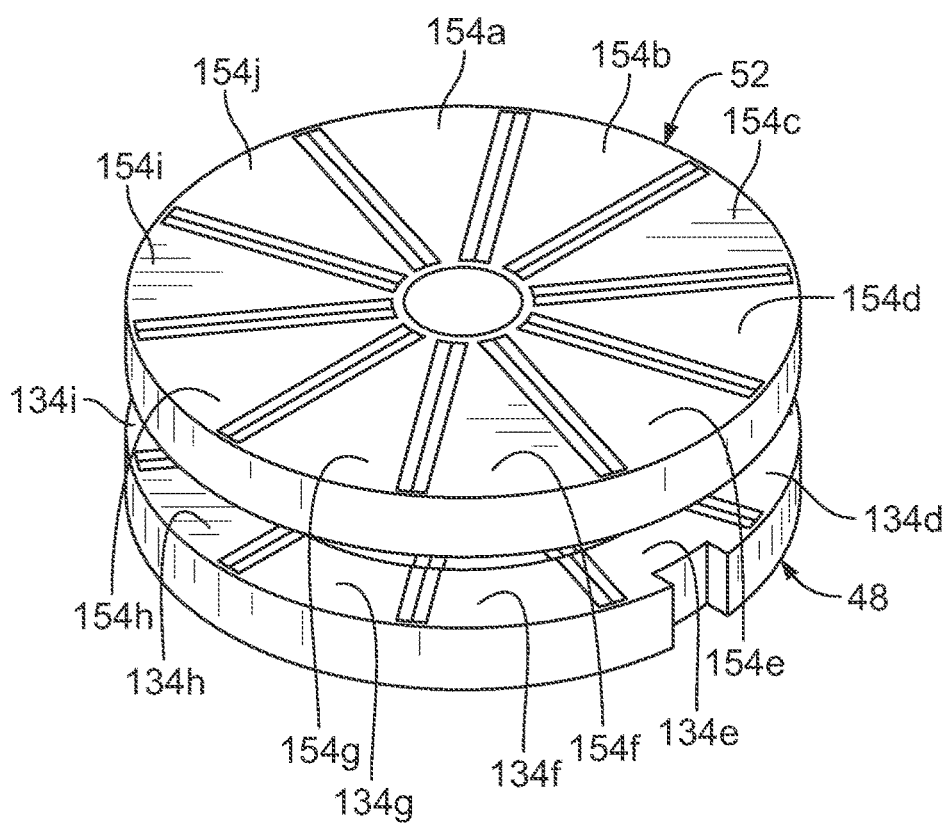
FIG. 10B is a partial perspective view of the second magnetic platter placed over the first magnetic platter in a second position.

FIG. 10A is a perspective view showing the first and second magnetic platters 48, 52 in a first position, and FIG. 10B is perspective view showing the first and second magnetic platters 48, 52 in a second position. It is noted that the second magnetic platter 52 is shown with some elements removed for convenience of illustration only in order to show the soft-magnet blocks 154a-j thereof overlapped with the soft-magnet blocks 134a-j of the first magnetic platter 48.

As shown in FIG. 10A, when the second magnetic platter 52 is in the first position, it overlaps the first magnetic platter 48 such that the north polarity soft-magnet blocks 154b, 154d, 154f, 154h, 154j of the second magnetic platter 52 overlay the south polarity soft-magnet blocks 134a, 134c, 134e, 134g, 134i of the first magnetic platter 48, and the south polarity soft-magnet blocks 154a, 154c, 154e, 154g, 154i of the second magnetic platter 52 overlay the north polarity soft-magnet blocks 134b, 134d, 134f, 134h, 134j of the first magnetic platter 48. More succinctly, the soft-magnet blocks overlaying each other are of opposite polarity. This is an "unaligned" position where the pedal 14 is in a magnetically inactive state, and the pedal 14 will not exert a significant external magnetic force. Specifically, by overlapping soft-magnet blocks of opposite polarity the magnetic flux lines are close-circuited, which prevents the magnetic force from extending beyond the first and second magnetic layers.

A user can rotate the second magnetic platter 52, e.g., through engagement of the cleat 12 with the keyed protrusion 148 of the second magnetic platter 52, by angle α to the second position shown in FIG. 10B. As shown in FIG. 10B, when the second magnetic platter 52 is in the second position, it overlaps the first magnetic platter 48 such that the north polarity soft-magnet blocks 154b, 154d, 154f, 154h, 154j of the second magnetic platter 52 overlay the north polarity soft-magnet blocks 134b, 134d, 134f, 134h, 134j of the first magnetic platter 48, and the south polarity soft-magnet blocks 154a, 154c, 154e, 154g, 154i of the second magnetic platter 52 overlay the south polarity soft-magnet blocks 134a, 134c, 134e, 134g, 134i of the first magnetic platter 48. More succinctly, the soft-magnet blocks overlaying each other are of the same polarity. This is an "aligned" position where the pedal 14 is in a magnetically active state, and the pedal 14 will exert a significant external magnetic force. Specifically, by overlapping soft-magnet blocks of the same polarity the magnetic flux lines are incomplete and open, which allows the magnetic force to extend beyond the second magnetic platter 52. Since the cleat 12 is implemented to rotate the second magnetic platter 52, the pedal 14 will be switched from the first position (the inactive state) to the second position (the active state) while the cleat 12 is adjacent the second magnetic platter 52. As a result, the magnetic force that is generated in the active state will be imparted on the cleat 12, which is formed of a ferrous metal, and secure the cleat 12 to the second magnetic platter 52 and the pedal 14. A contemplated range of force generated in the active state is 60-120 pound-force (lbf). The magnitude of the force is dictated by the size and thickness of the permanent magnet plates 124. As such, the size and thickness of the permanent magnet plates 124 utilized can be varied depending on desired implementation, e.g., the pedal 14 can be manufactured in low, medium, and high force variations each with varying size and thickness permanent magnet plates 124.

Figure 11A:
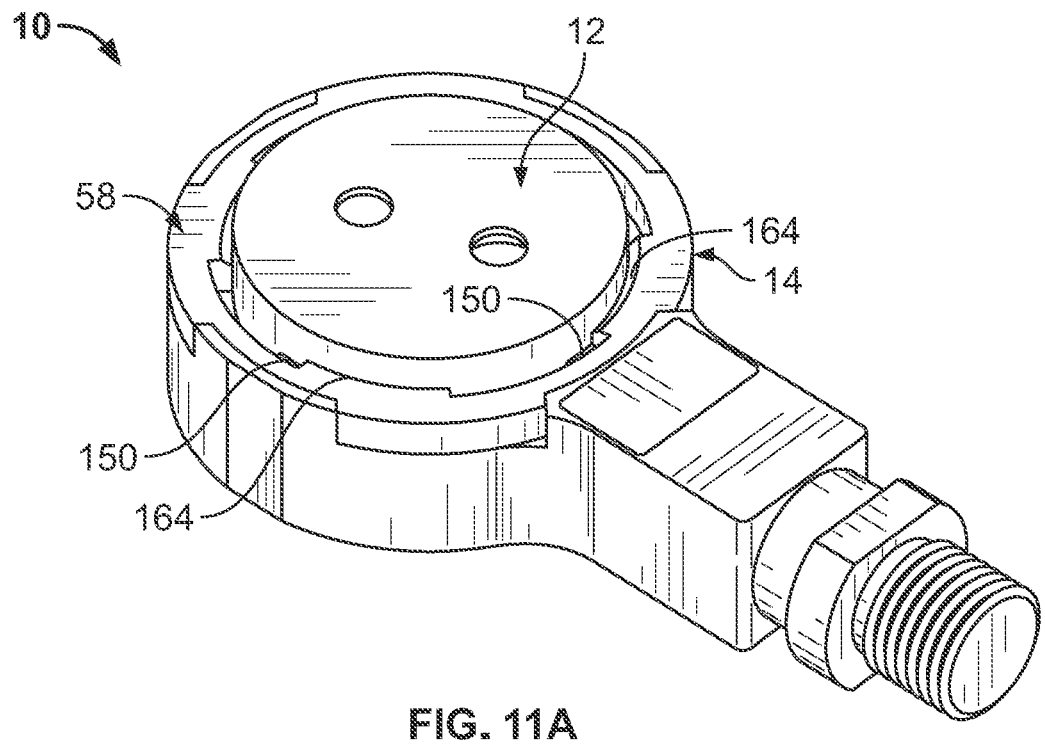
FIG. 11A is a perspective view of the magnetic engagement mechanism with the cleat connected with the pedal in a first position.
Figure 11B:
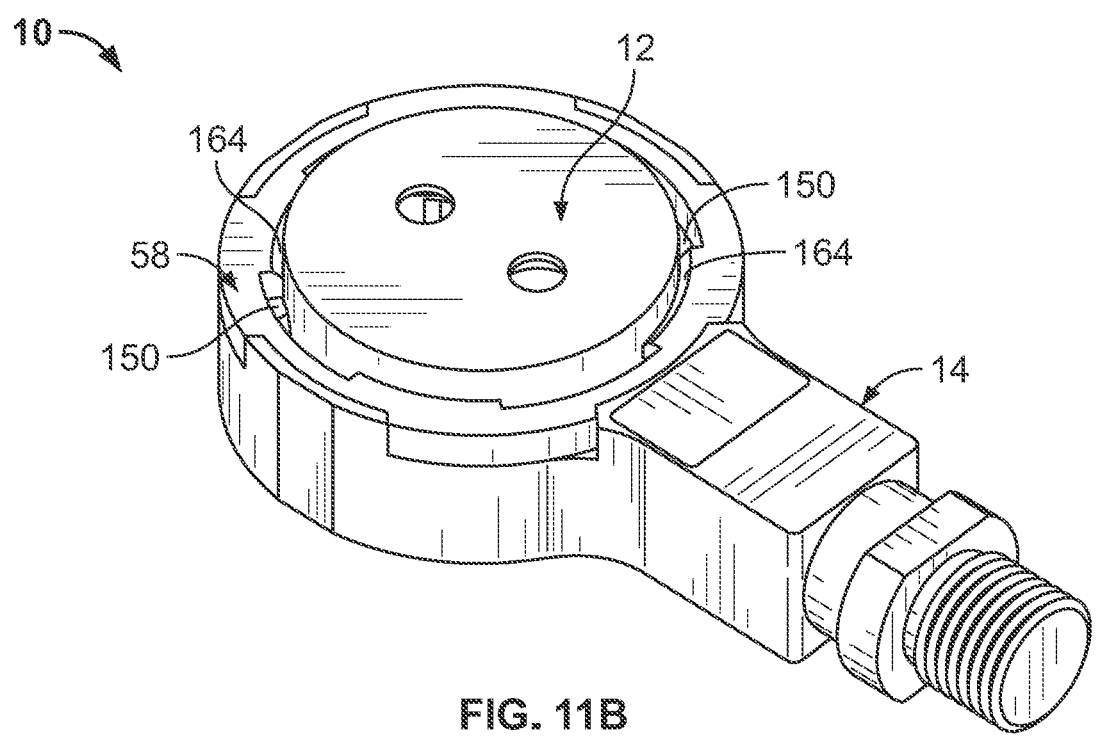
FIG. 11B is a perspective view of the magnetic engagement mechanism with the cleat connected with the pedal in a second position.

FIG. 11A is a perspective view of the cleat 12 connected with the pedal 14 in the first position, e.g., in an inactive state. FIG. 12A is a perspective view of the cleat 12 connected with the pedal 14 in the second position, e.g., in an active state. The cleat 12 is shown detached from the shoe 36 for ease of illustration and to show the position of the cleat 12 on the pedal 14, however, it should be understood that the cleat 12 would generally be utilized attached to the shoe 36. When the pedal is in the first position and inactive, the user can place their foot, including shoe 36 with attached cleat 12, on the pedal 14 and align the keyed recess 24 of the cleat 12 with the keyed protrusion 148 of the second magnetic platter 52. The chamfered edge of the platter retention ring 58 can assist with this alignment. Additionally, the keyed protrusion 148 can have a height greater than the platter retention ring 58 so that it extends beyond the platter retention ring 58 creating an edge for a user to locate with the cleat 12, which can assist with connecting the cleat 12 to the pedal 14.

Once the keyed recess 24 is aligned with the keyed protrusion 148, the user can press downward to seat the keyed protrusion 148 within the keyed recess 24. At this point, the user's foot will be angled with respect to the pedal 14 and a typical pedaling position. Once the keyed protrusion 148 is seated within the keyed recess 24, the user can rotate the second magnetic platter 52 into the second position. This is done by the user rotating their foot in a first direction, and therefore shoe 36 and attached cleat 12, to cause the cleat 12 to rotate the second magnetic platter 52. The second magnetic platter 52 can be rotated up to angle α, at which point the blocks 150 of the second magnetic platter 52 will contact the stops 164 of the platter retention ring 58 and prevent the second magnetic platter 52 from being rotated any further. This places the second magnetic platter 52 in the second position, e.g., an active state, causing the cleat 12 to be magnetically secured to the second magnetic platter 52. The user can then pedal the bicycle in a typical fashion and their shoe 36 will be secured to the pedal 14 through the magnetic engagement of the cleat 12 with the second magnetic platter 52. To release their shoe 36, the user twists their foot in a second direction opposite the first direction, which causes the cleat 12 to rotate the second magnetic platter 52 back to the first position where it is magnetically inactive. In the first position, as discussed above, minimal magnetic force is exerted from the pedal 14 on the cleat 12, allowing the user can pull the cleat 12 from engagement with the second magnetic platter 52. The above described functionality and operation holds true for both right and left shoes.

Figure 12:
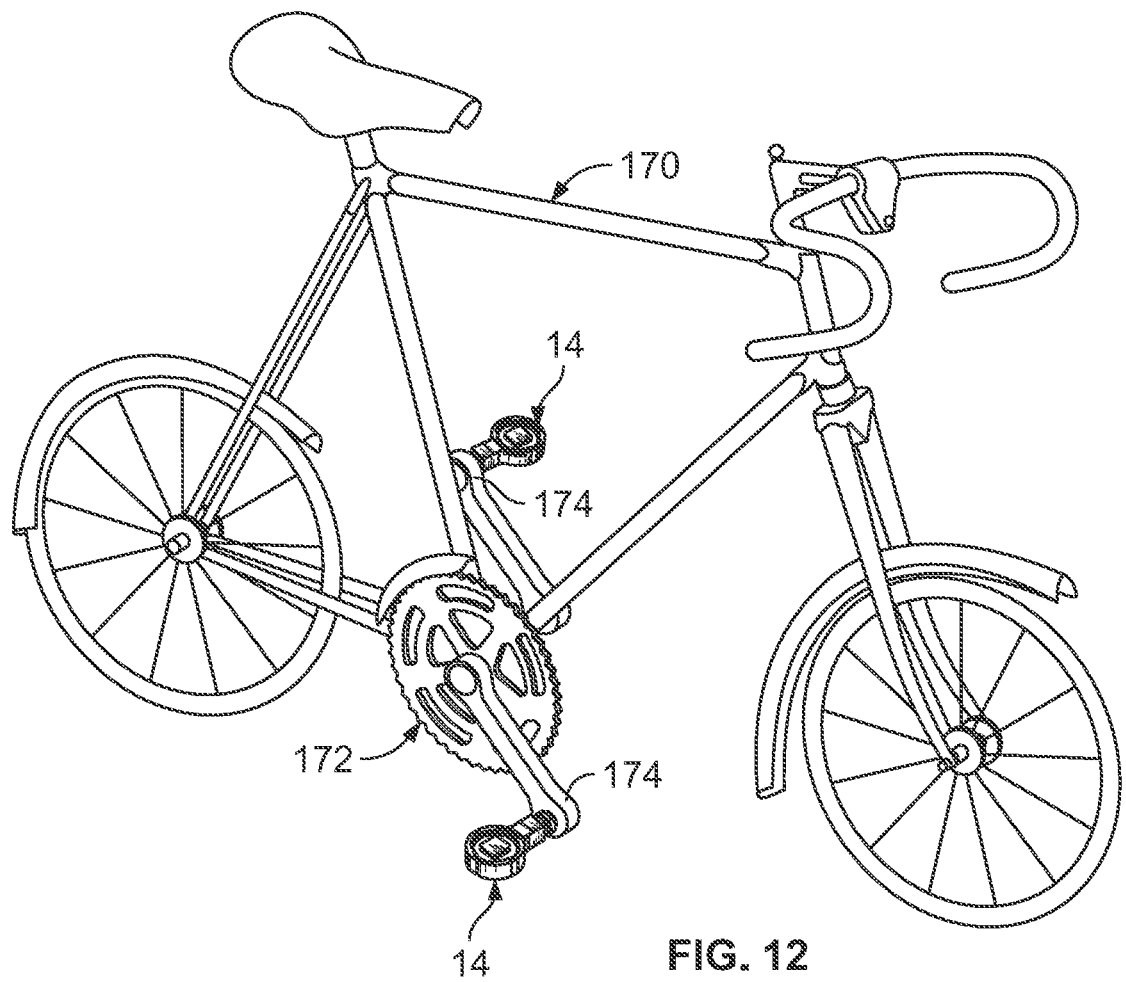
FIG. 12 is a perspective view of the pedal connected to a bicycle.

FIG. 12 is a perspective view showing the pedals 14 attached to a bicycle 170. As discussed above, the bicycle 170 includes a crankset 172 having crank arms 174. A pedal 14 can be connected to each of the crank arms 174 through a threaded engagement. Particularly, the threaded outer extension 106 (see FIG. 5) of the spindle 96 of the pedal 14 can threadedly engage the crank arms 174. The threaded outer extension 106 can be further tightened and secured to the crank arms 174 by a wrench or other tool turning the head 108 of the spindle 96.

Figure 13:
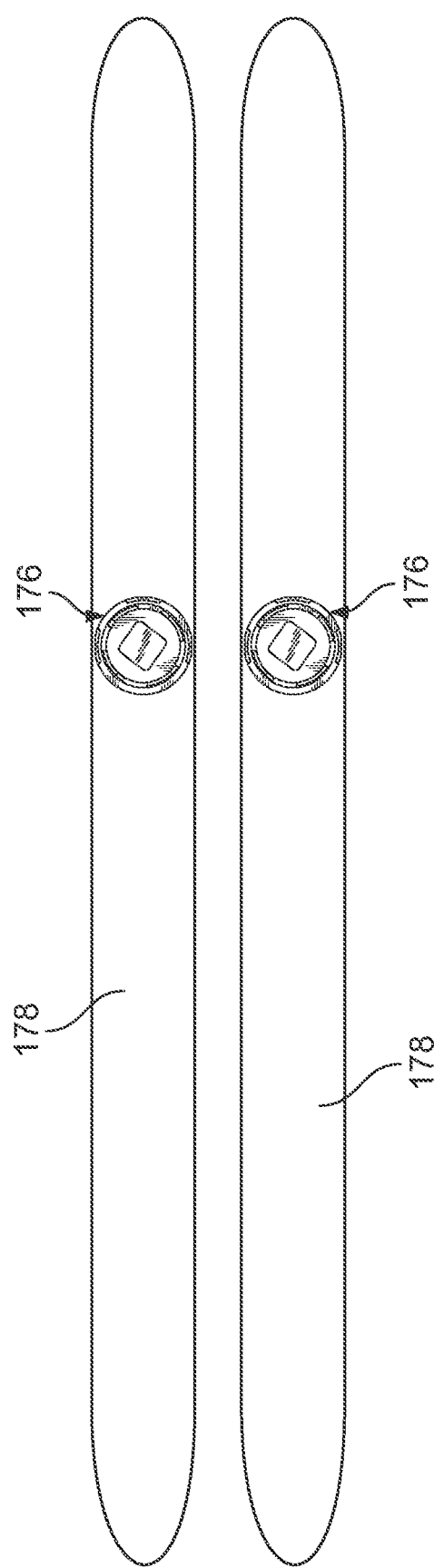
FIG. 13 is a perspective view of a binding secured to a pair of skis.

FIG. 13 is a perspective view of an alternative embodiment of the pedal 14 in the form of a binding 176 secured to a pair of skis 178. The binding 176 is similar in construction to the pedal 14, but without the stem 66 and spindle assembly 60. The binding 176 functions in the same fashion as the pedal 14, which need not be repeated. Thus, it should be understood that the above-description provided in connection with the pedal 14 holds true for the binding 176. The cleat 16 could be connected to the bottom of ski boots in place of cycling shoes 36 to allow a user to secure their ski boots to the skis 178. The binding 176 could alternatively be secured to other transportation apparatuses such as snowboards and water-skis, and exercise devices such as stationary bicycles.

It is also contemplated by the present disclosure for the pedal 14, binding 176, and cleat 16 to include a microprocessor and one or more sensors, and be Internet-of-Things (IOT) connected. Particularly, the microprocessor can be in wireless communication with a user's smartphone or smartwatch and relay parameters sensed by the one or more sensors thereto. The smartphone or smartwatch can then transfer this information to the Internet where it can be accessed by the user from various devices and locations. The parameters sensed by the one or more sensors can include force, rotation, speed, etc., and can be used to calculate various data, e.g., efficiency. This functionality allows a user to track their performance.

Figure 14:
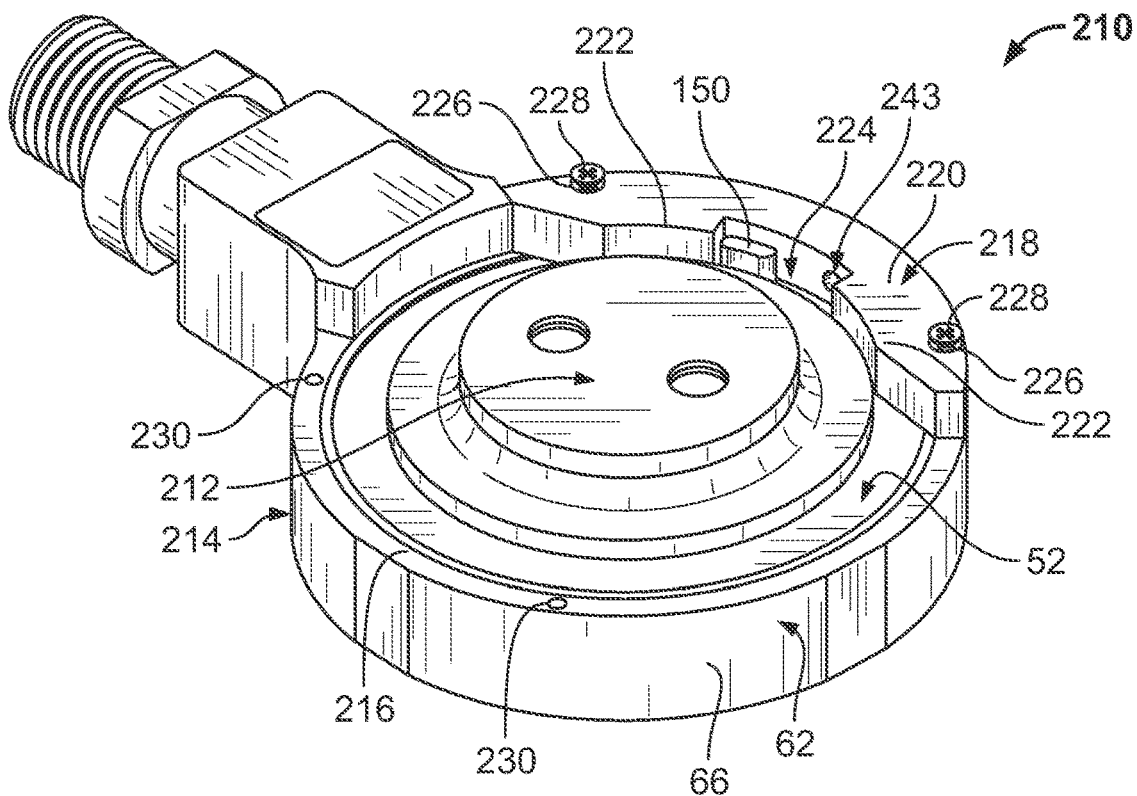
FIG. 14 is a perspective view of another embodiment of the magnetic engagement mechanism of the present disclosure.

FIG. 14 is a perspective view of another embodiment of a magnetic engagement mechanism 210 of the present disclosure having a modified cleat 212 and a modified pedal 214. The modified pedal 214 can be substantially similar in construction to the pedal 14 shown in FIG. 1, the details and components of which need not be repeated. It should be understood that the modified pedal 214 includes a number of the same components as the pedal 14 shown in FIGS. 1 and 5, and like component numbers are used for like components. The modified pedal 214 differs from the pedal 14 shown in FIG. 1 at least in that the annular sidewall 66 of the platter holder 62 does not include a plurality of abutments 78, and the modified pedal 200 does not include a platter retention ring 58. Instead, the annular sidewall 66 of the platter holder 62 terminates at an upper surface 216 that is substantially planar with the second magnetic platter 52. Additionally, the modified pedal 214 includes a bumper guide 218 in place of the platter retention ring 58. The bumper guide 218 can include a body 220 defining a plurality of stops 222 separated by a gap 224. The body 220 can also include a plurality of holes 226 (threaded or unthreaded) extending therethrough which facilitate mounting the bumper guide 218 to the platter holder 62. The bumper guide 218 can be secured to the platter holder 62 by a plurality of screws 228 that can extend through the holes 226 and threadedly engage a plurality of threaded holes 230 that extend through the upper surface 216 of the platter holder 62. The platter holder 62 can include four holes which allow the bumper guide 218 to be selectively mounted on opposite sides of the pedal 214, e.g., depending on if the pedal 214 is going to be placed on the right or left side of a bicycle.

The bumper guide 218 functions in a similar fashion to the platter retention ring 58 in that when it is secured to the platter holder 62 it locks the second magnetic platter 52, the bushing 50, and the first magnetic platter 48 within the platter holder 62 so that they are axially constrained, but permits the second magnetic platter 52 to rotate with respect to the first magnetic platter 48 when engaged by the cleat 12. Additionally, the bumper guide 218 acts as a front bumper wall that will contact the cleat 12, 212 and prevent a user's foot from sliding forward off of the pedal 214 when they are attempting to engage the cleat 12, 212 with the pedal 214.

In contrast to the platter retention ring 58, the bumper guide 218 spans only a portion of the circumference of the platter holder 62 instead of the entirety. For example, the bumper guide 218 can extend about one-quarter (¼) of the circumference of the platter holder 62, while leaving three-quarters (¾) of the circumference of the platter holder 62 open. This configuration assists with ease of insertion of the cleat 12, 212 as it allows a user to slide the cleat 12, 212 into the proper position and into engagement with the modified pedal 214, as opposed to having to inset the cleat 12, 212 into the platter retention ring 58.

Additionally, when the bumper guide 218 is secured to the platter holder 62, a block 150 of the second magnetic platter 52 is positioned within the gap 224 so that when the second magnetic platter 52 is rotated the block 150 rides within the gaps 224. Continued rotation of the second magnetic platter 52 results in the block 150 contacting the stops 222, which prevent the second magnetic platter 52 from further rotation. Accordingly, the stops 222 set the angular rotation of the second magnetic platter 52, and are therefore sized and spaced so that the second magnetic platter 52 can only be rotated by angle α, e.g., the angle that the permanent magnet plates 124 are from adjacent permanent magnet plates 124 as discussed in connection with FIGS. 8 and 9. Any attempt to rotate the second magnetic platter 52 further is prevented by the stops 222 engaging the block 150. Therefore, the stops 222 can be positioned to only allow 36° of rotation (e.g., for 10 plates), 30° of rotation (e.g., for 12 plates), 20° of rotation (e.g., for 18 plates), etc., depending on the number of permanent magnet plates 124. This configuration allows the second magnetic platter 52 to be rotated between a first position (e.g., an unaligned magnetically inactive position) and a second position (e.g., an aligned magnetically active position). In a preferred embodiment, the first magnetic platter 48 and the second magnetic platter 52 each include eighteen (18) permanent magnet plates 124, which require a preferred rotational angle of 20° for activation and deactivation.

Figure 15:
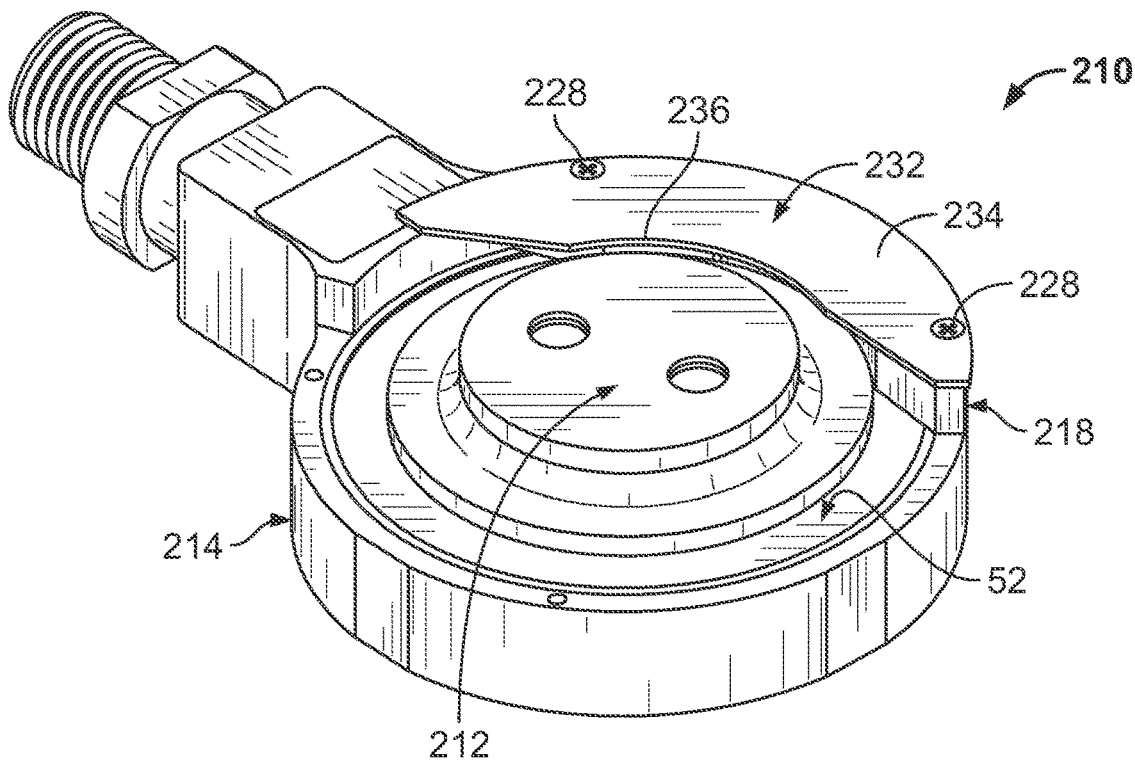
FIG. 15 is a perspective view of the magnetic engagement mechanism of FIG. 14 including a catch plate of the present disclosure.

FIG. 15 is a perspective view of the magnetic engagement mechanism 214 including a catch plate 232 of the present disclosure connected to the modified pedal 214. The catch plate 232 includes a curved body 234 defining an inner arcuate edge 236. The catch plate 232 can be secured to the bumper guide 218 or the platter retention ring 58 by screws 228, which extend through the curved body 234. Alternatively, the catch plate 232 can be integral with the bumper guide 218 or the platter retention ring 58. It should be understood that the catch plate 232 can be used with the pedal 14 shown in FIG. 1 or the modified pedal 214 shown in FIG. 14. The catch plate 232 functions to guide and align the cleat 12, 212 with the keyed protrusion 148 of the second magnetic platter 52 during insertion. That is, when a user attempts to engage the pedal 14, 214 with the cleat 12, 212, they can slide the cleat 12, 212 into engagement with the inner arcuate edge 236, which places the cleat 12, 212 directly above the keyed protrusion 148 of the second magnetic platter 52. The user can then rotate the cleat 12, 212 within the inner arcuate edge 236 until the cleat 12, 212 is aligned with the keyed protrusion 148, push downward to mate the keyed protrusion 148 with the cleat 12, 212, and then rotate the cleat 12, 212 to activate the magnetic circuit and secure the cleat 12, 212 to the pedal 14, 214.

Figure 16:
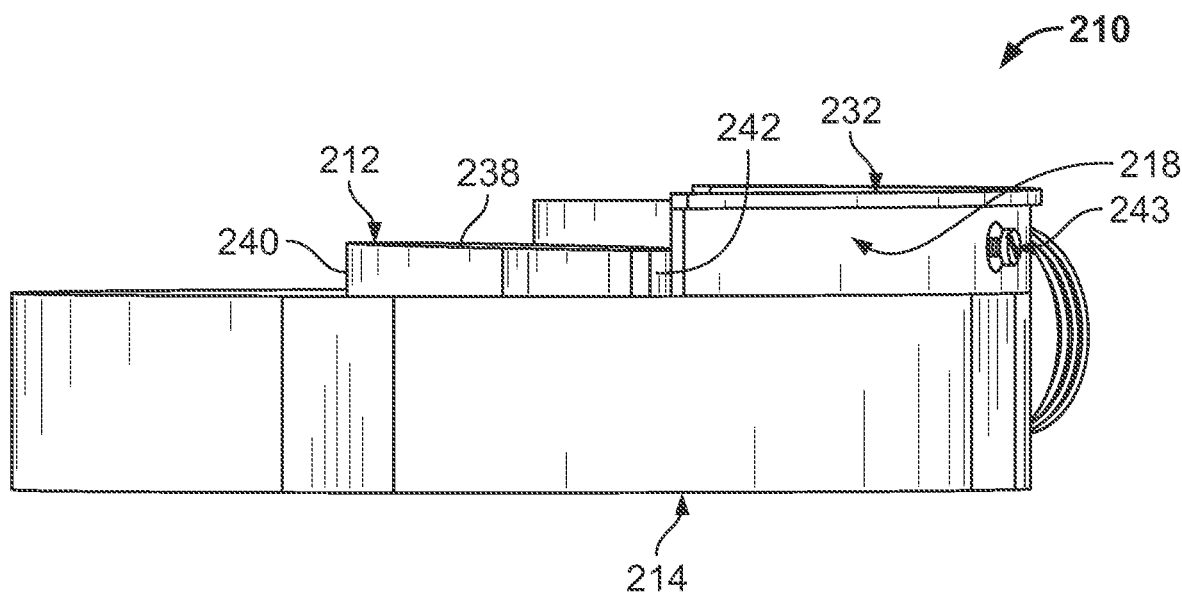
FIG. 16 is a side view of the modified pedal of FIG. 14 including a modified cleat.

FIG. 16 is a side view of the modified pedal 214 showing the modified cleat 212 in greater detail. The modified cleat 212 can be similar in construction to the cleat 12 shown in, for example, FIGS. 1 and 2, and includes the keyed recess 24 and keyed perimeter 26 shown in FIG. 2. However, the modified cleat 212 includes a slanted top surface 238 instead of a flat top surface 18 (see FIG. 1). The slanted top surface 238 can extend from a wider rear portion 240 to thinner front portion 242 of the modified cleat 212. When the cleat 212 is attached to a shoe 36 the wider rear portion 240 will extend below the thinner front portion 242 such that when a user attempts to engage the modified cleat 212 with the keyed protrusion 148 of the pedal 14, 214 the underside of the modified cleat 212 will contact the keyed protrusion 148 at an angle. This configuration exposes the keyed perimeter 26 of the modified cleat's keyed recess 24, allowing the keyed perimeter 26 to act as a "catch" on the keyed protrusion 148. Thus, the modified pedal 214 allows for a user to more easily engage the keyed protrusion 148 with the keyed recess 24.

The modified pedal 214 can also include a spring-loaded screw 243 that extends through the bumper guide 218 (see FIGS. 14 and 16). The spring-loaded screw 243 can be tightened by a user to cause it to be inserted through the bumper guide 218 and extend further toward the cleat 12, 212. Further insertion of the spring-loaded screw 243 can cause it place pressure on the cleat 12, 212 which can prevent premature deactivation of the magnetic circuit, e.g., release of the cleat 12, 212 from the pedal 214. It should be understood that the spring-loaded screw 243 can be utilized for both the modified pedal 214 as well as the pedal 14 shown in FIGS. 1 and 5.

Figure 17:
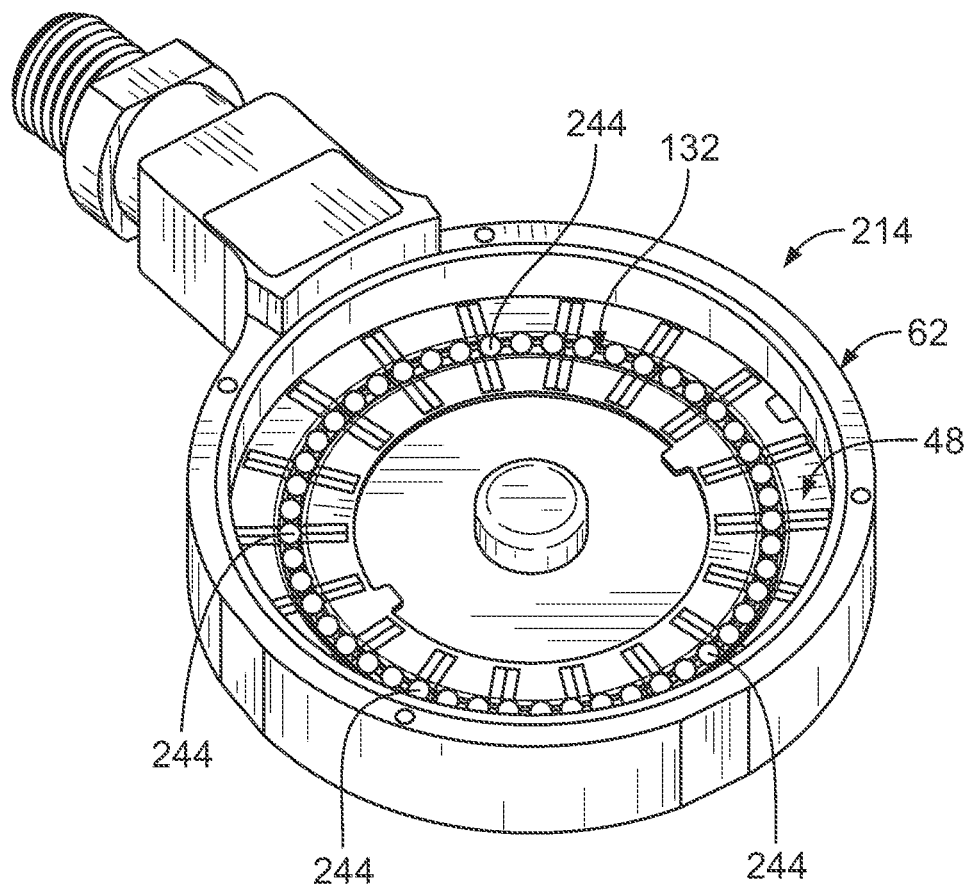
FIG. 17 is a perspective view of the interior of the modified pedal of FIG. 14 showing a plurality of ball bearings.

FIG. 17 is a perspective view of the modified pedal 214 showing the inclusion of a plurality of ball bearings 244. Specifically, the plurality of ball bearings 244 are placed in the annular recess 132 of the first magnetic platter 48 and replace the annular platter bushing 50 discussed in connection with FIGS. 5, 8, and 9. The plurality of ball bearings 244 are positioned between the first magnetic platter 48 and the second magnetic platter 52, and space the first and second magnetic platters 48, 52 apart with the second magnetic platter 52 riding on the ball bearings 244. The ball bearings 244 reduce friction due to rotation of the second magnetic platter 52 and smooth the rotation of the second magnetic platter 52.

Some embodiments of the present disclosure are directed to a pedal for a bicycle, comprising: a body; a spindle assembly rotatably secured to the body and configured to be connected to said bicycle; a first magnetic platter positioned and non-rotatably secured within the body, the first magnetic platter comprising: at least two blocks, and at least one permanent magnet plate having a magnetic north face and a magnetic south face, the at least one permanent magnet plate positioned between the at least two blocks with a first of the at least two blocks adjacent the magnetic north face and a second of the at least two blocks adjacent the magnetic south face, the at least one permanent magnet plate magnetizing the first of the at least two blocks with a magnetic north polarity and the second of the at least two blocks with a magnetic south polarity; and a second magnetic platter positioned and rotatably secured within the body overlaying the first magnetic platter, the second magnetic platter comprising: at least two blocks, at least one permanent magnet plate having a magnetic north face and a magnetic south face, the at least one permanent magnet plate positioned between the at least two blocks with a first of the at least two blocks adjacent the magnetic north face and a second of the at least two blocks adjacent the magnetic south face, the at least one permanent magnet plate magnetizing the first of the at least two blocks with a magnetic north polarity and the second of the at least two sections with a magnetic south polarity, and a keyed protrusion configured to be engaged by a ferrous metal cleat, wherein the second magnetic platter is rotatable by said ferrous metal cleat between a first position where the first of the at least two blocks of the second magnetic platter overlays the second of the at least two blocks of the first magnetic platter and the second of the at least two blocks of the second magnetic platter overlays the first of the at least two blocks of the first magnetic platter, and a second position where the first of the at least two blocks of the second magnetic platter overlays the first of the at least two blocks of the first magnetic platter and the second of the at least two blocks of the second magnetic platter overlays the second of the at least two blocks of the first magnetic platter, and wherein when the second magnetic platter is in the first position the pedal is in a magnetically inactive state and said cleat is not magnetically secured to the second magnetic platter, and when the second magnetic platter is in the second position the pedal is in a magnetically active state and said cleat is magnetically secured to the second magnetic platter.

Some embodiments of the present disclosure are further directed to a pedal for a bicycle, comprising: a body; a spindle assembly rotatably secured to the body and configured to be connected to said bicycle; a first magnetic platter positioned and non-rotatably secured within the body, the first magnetic platter comprising: an even number of permanent magnet plates each having a magnetic north face and a magnetic south face, and a plurality of blocks with at least one block of the plurality of blocks positioned between each adjacent pair of permanent magnet plates, the permanent magnet plates magnetizing each of the plurality of blocks with either a magnetic north polarity or a magnetic south polarity such that adjacent blocks are of opposite magnetic polarities; and a second magnetic platter positioned and rotatably secured within the body overlaying the first magnetic platter, the second magnetic platter comprising: an even number of permanent magnet plates each having a magnetic north face and a magnetic south face, and a plurality of blocks with at least one block of the plurality of blocks positioned between each adjacent pair of permanent magnet plates, the permanent magnet plates magnetizing each of the plurality of blocks with either a magnetic north polarity or a magnetic south polarity such that adjacent blocks are of opposite magnetic polarities, and a keyed protrusion configured to be engaged by a ferrous metal cleat, wherein the second magnetic platter is rotatable by said ferrous metal cleat between a first position where the magnetic south polarity blocks of the second magnetic platter overlay the magnetic north polarity blocks of the first magnetic platter and the magnetic north polarity blocks of the second magnetic platter overlay the magnetic south polarity blocks of the first magnetic platter, and a second position where the magnetic south polarity blocks of the second magnetic platter overlay the magnetic south polarity blocks of the first magnetic platter and the magnetic north polarity blocks of the second magnetic platter overlay the magnetic north polarity blocks of the first magnetic platter, and wherein when the second magnetic platter is in the first position the pedal is in a magnetically inactive state and said cleat is not magnetically secured to the second magnetic platter, and when the second magnetic platter is in the second position the pedal is in a magnetically active state and said cleat is magnetically secured to the second magnetic platter.

Some embodiments of the present disclosure are further directed to a magnetic engagement mechanism for a transportation apparatus, comprising: a body; a first magnetic platter positioned and non-rotatably secured within the body, the first magnetic platter comprising: an even number of permanent magnet plates each having a magnetic north face and a magnetic south face, and a plurality of blocks with at least one block of the plurality of blocks positioned between each adjacent pair of permanent magnet plates, the permanent magnet plates magnetizing each of the plurality of blocks with either a magnetic north polarity or a magnetic south polarity such that adjacent blocks are of opposite magnetic polarities; and a second magnetic platter positioned and rotatably secured within the body overlaying the first magnetic platter, the second magnetic platter comprising: an even number of permanent magnet plates each having a magnetic north face and a magnetic south face, and a plurality of blocks with at least one block of the plurality of blocks positioned between each adjacent pair of permanent magnet plates, the permanent magnet plates magnetizing each of the plurality of blocks with either a magnetic north polarity or a magnetic south polarity such that adjacent blocks are of opposite magnetic polarities, and a keyed protrusion configured to be engaged by a ferrous metal cleat, wherein the second magnetic platter is rotatable by said ferrous metal cleat between a first position where the magnetic south polarity blocks of the second magnetic platter overlay the magnetic north polarity blocks of the first magnetic platter and the magnetic north polarity blocks of the second magnetic platter overlay the magnetic south polarity blocks of the first magnetic platter, and a second position where the magnetic south polarity blocks of the second magnetic platter overlay the magnetic south polarity blocks of the first magnetic platter and the magnetic north polarity blocks of the second magnetic platter overlay the magnetic north polarity blocks of the first magnetic platter, and wherein when the second magnetic platter is in the first position the magnetic engagement mechanism is in a magnetically inactive state and said cleat is not magnetically secured to the second magnetic platter, and when the second magnetic platter is in the second position the magnetic engagement mechanism is in a magnetically active state and said cleat is magnetically secured to the second magnetic platter.

FIGS. 18-25 illustrate another embodiment of a magnetic engagement mechanism 310 of the present disclosure having a cleat 312 and a pedal 314. The pedal 314 can be similar in construction to the pedal 14 shown in, and described in connection with, FIG. 1, the entire details and components of which need not be repeated, with distinctions being noted herein.

Figure 18:
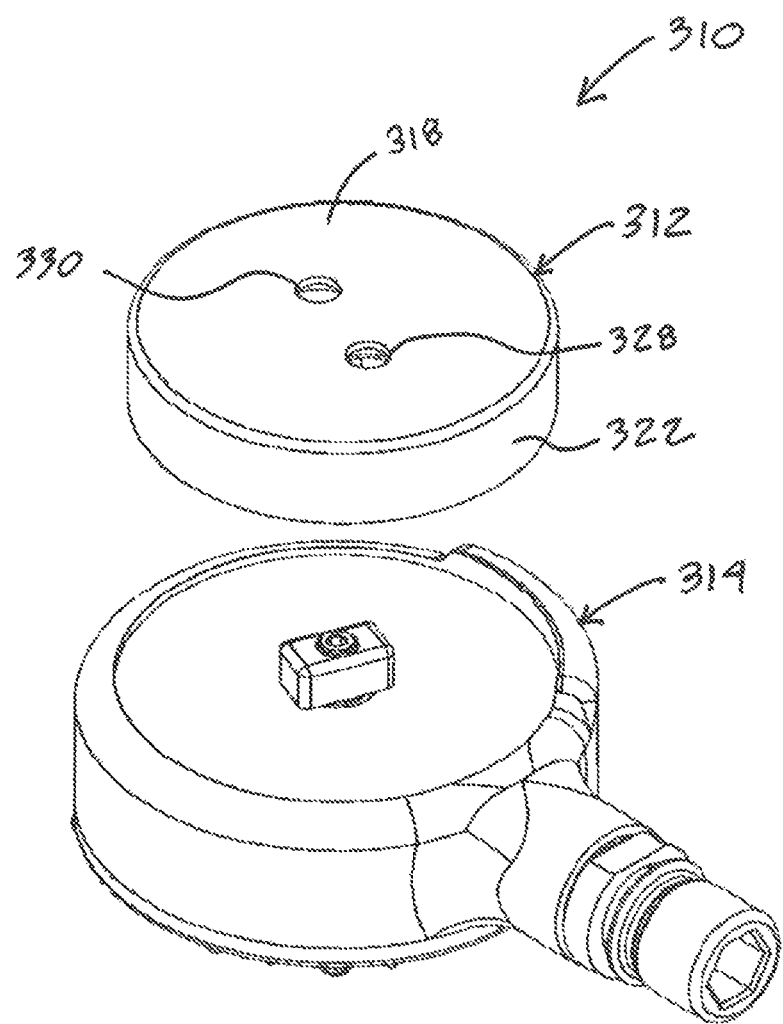
FIG. 18 is an exploded perspective view of another embodiment of the magnetic engagement mechanism of the present disclosure.
Figure 19:
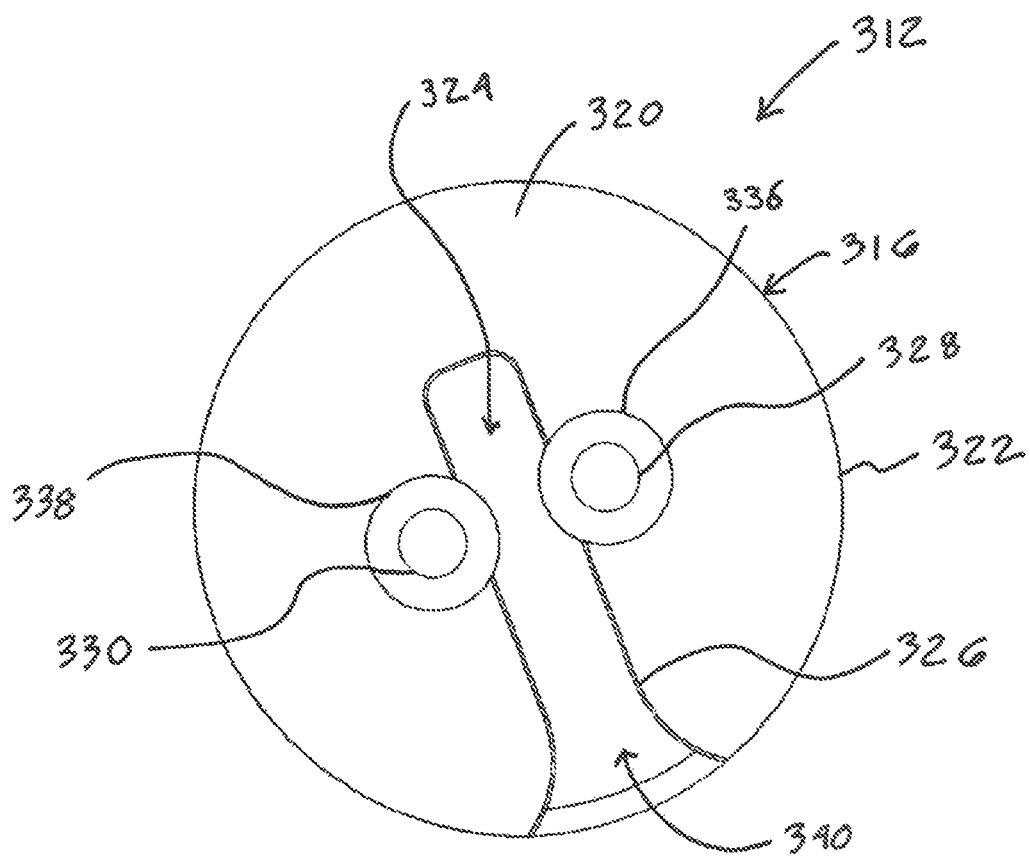
FIG. 19 is a bottom view of a cleat of the magnetic engagement mechanism of FIG. 18.
Figure 20:
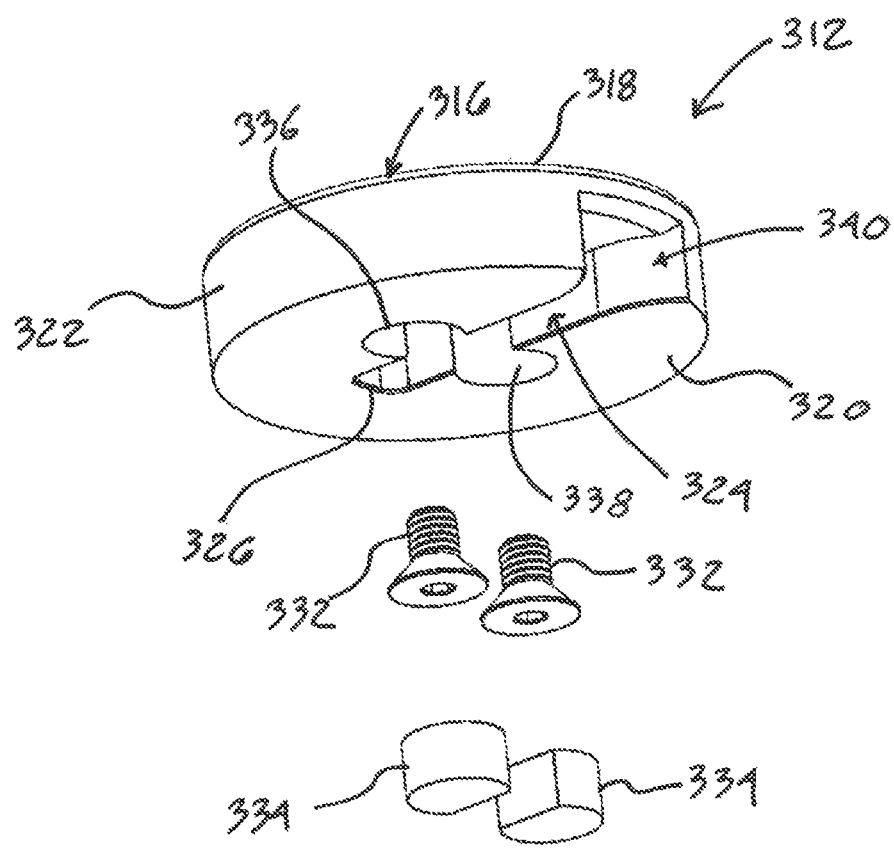
FIG. 20 is an exploded view of the cleat of the magnetic engagement mechanism of FIG. 18 including mounting screws and plugs.

FIG. 18 is a perspective view of the magnetic engagement mechanism 310 including the cleat 312 and the pedal 314. FIG. 19 is a bottom view of the cleat 312 and FIG. 20 is an exploded view of the cleat 312, including screws 332 and plugs 334 for securing the cleat 312 to a shoe (e.g., the shoe 36 described in connection with FIGS. 3 and 4). The cleat 312 includes a body 316 having a top surface 318, a bottom surface 320, and an outer perimeter wall 322. The body 316 can be generally cylindrical in shape. The body 316 additionally includes a keyed recess 324 defined by a keyed perimeter 326. The keyed recess 324 extends into the body 316 from the bottom surface 320 and the outer perimeter wall 322. The keyed recess 324 is configured to engage a portion of the pedal 314, discussed in greater detail below (e.g., a cleat engagement block 368 discussed in connection with FIG. 21).

The body 316 additionally includes two holes 328, 330 that extend therethrough. The holes 328, 330 can be positioned at least partially in the recess 324, as shown in FIG. 19, and extend through the top surface 318, or they can be positioned outside of the recess 324 and extend from the bottom surface 320 to the top surface 318. The holes 328, 330 are configured to receive the screws 332, which can be inserted into and therethrough to secure the cleat 312 to a shoe (e.g., shoe 36) and prevent rotation relative thereto, as shown, for example, in FIGS. 3 and 4. The holes 328, 330 can have a tapered wall so that the screw heads lay flush. The cleat 312 is shown with two holes 328, 330, however, it should be understood that the cleat 312 can include any desired number of holes that will allow the cleat 312 to be secured to a shoe. It should be understood that other suitable means for securing the cleat to a shoe, boot, or other appendage covering are contemplated by the present disclosure, e.g., interference fit securing mechanisms, clips, etc.

The cleat 312 can also include removable plugs 334 that are configured to be removably secured within recesses 336, 338 that are adjacent the holes 328, 330 and sized to accommodate the screw heads. As shown, the recesses 328, 330 can interrupt the keyed perimeter 326 of the keyed recess 324 depending on placement of the holes 328, 330. As such, the plugs 334 are configured to complete the interrupted sections the keyed perimeter 326 when inserted into the recesses 328, 330, providing for enhanced engagement with the pedal 314 and preventing dirt and other debris from entering the screw heads and hindering operation thereof. The cleat 312 can also include an enlarged entrance region 340 that extends and tapers from the outer perimeter wall 322 into the keyed recess 324 to further enhance the ease of engagement between the cleat 312 and the pedal 314. That is, the enlarged entrance region 340 allows for the cleat engagement block 368 to more easily slide into the keyed recess 324, as discussed in connection with FIGS. 21 and 22.

Figure 21:
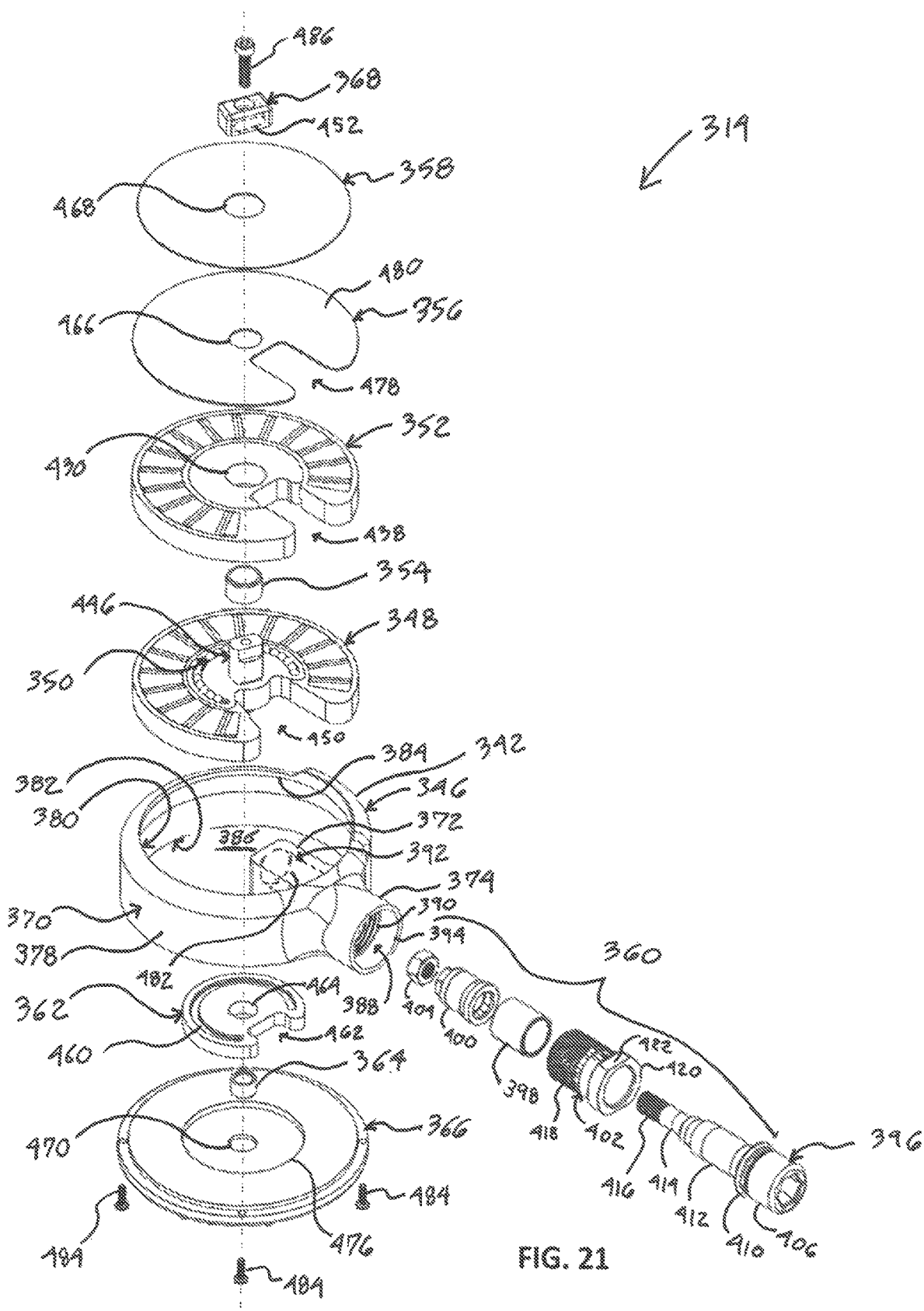
FIG. 21 is an exploded view of a pedal of the magnetic engagement mechanism of FIG. 18
Figure 22:
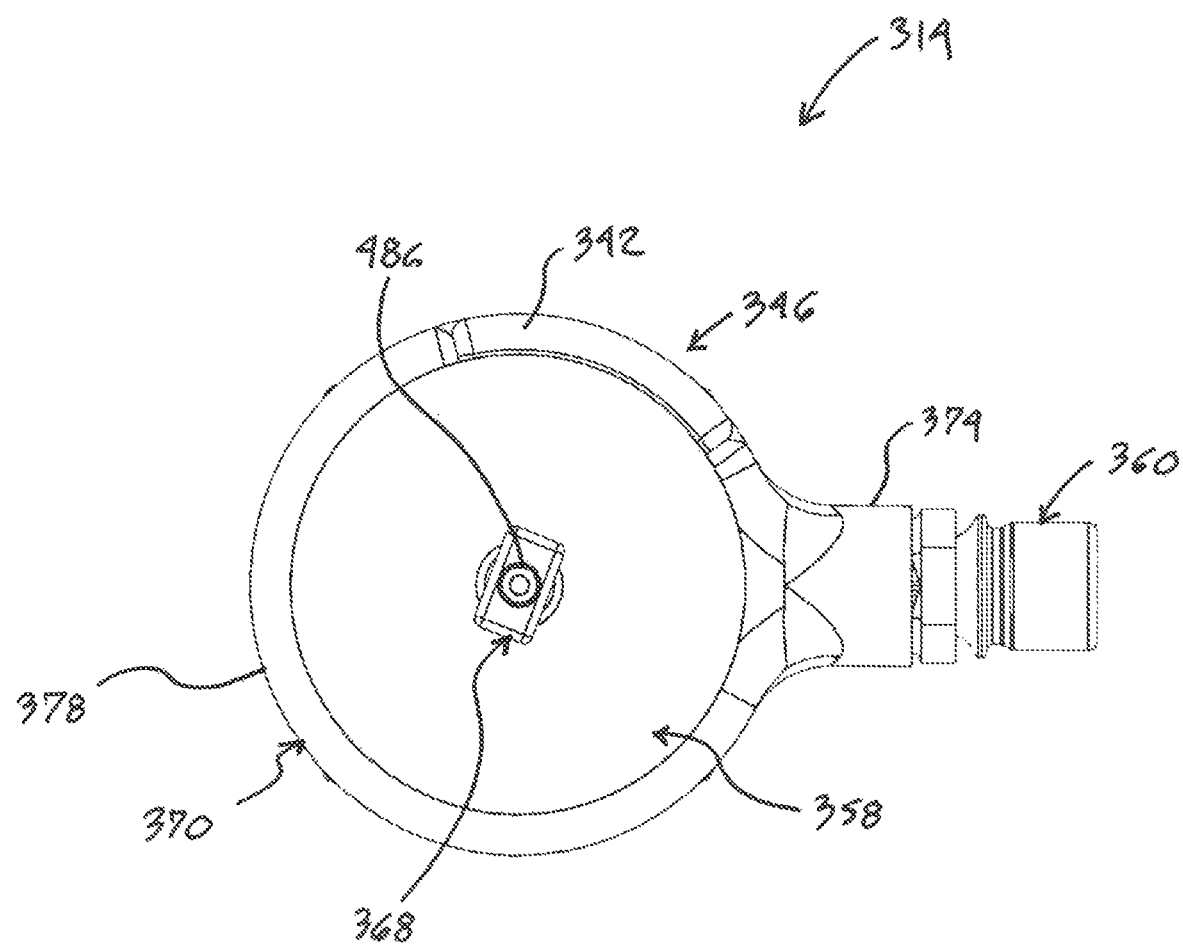
FIG. 22 is a top view of the pedal of FIG. 21.
Figure 23:
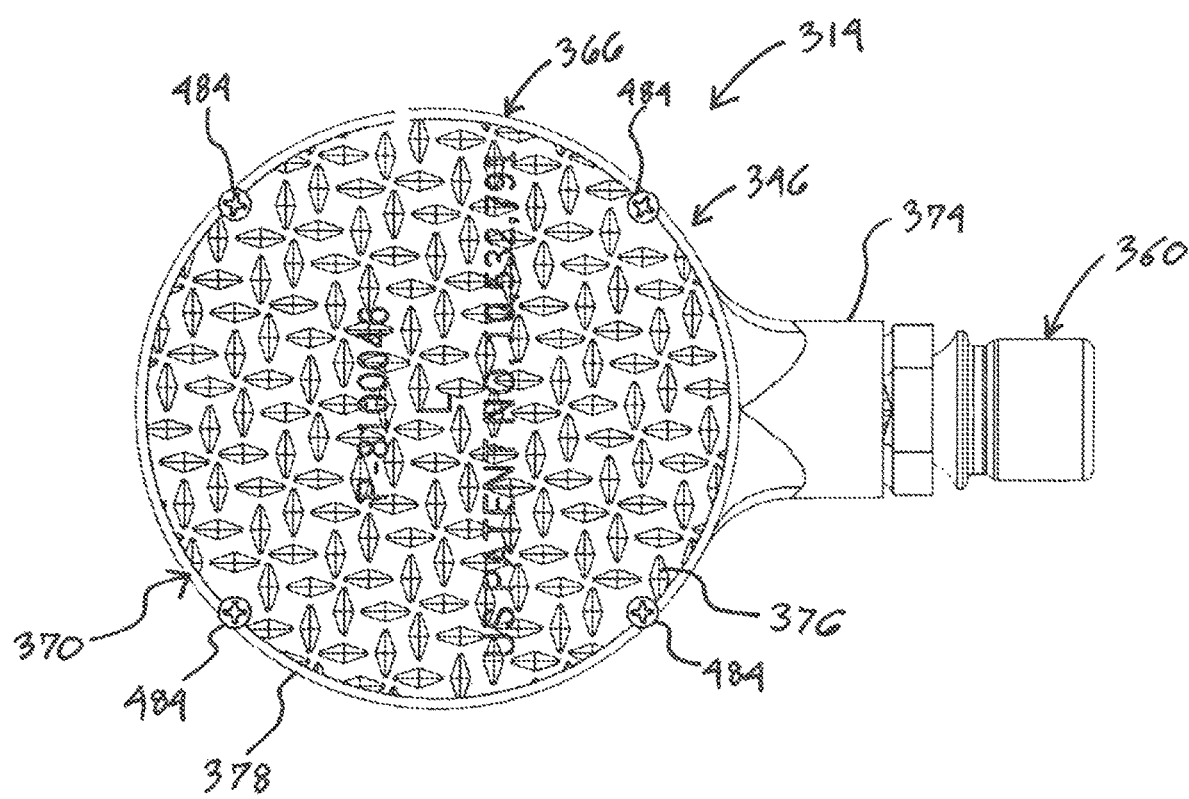
FIG. 23 is a bottom view of the pedal of FIG. 21.
Figure 29:
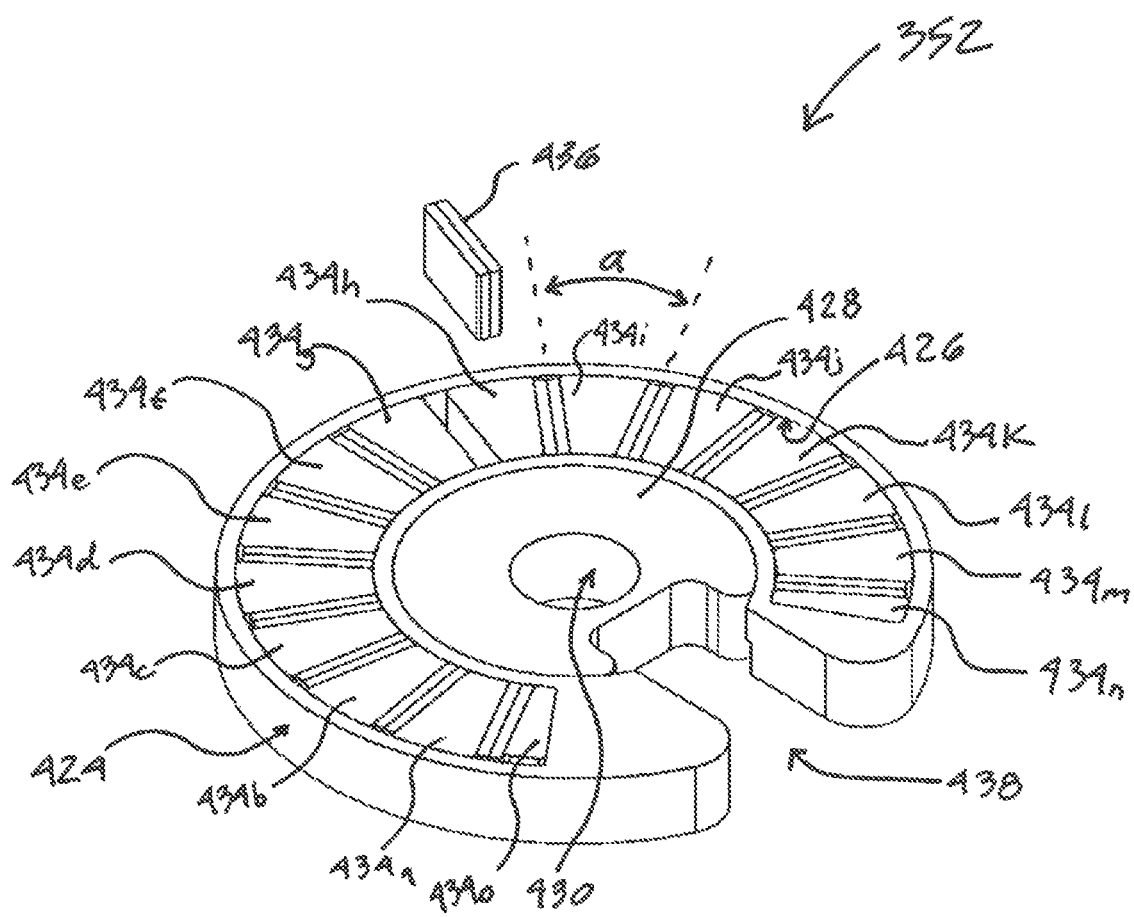

FIGS. 21-23 are exploded, top, and bottom views of the pedal 314, respectively. The pedal 314 includes a body 346, a first magnetic platter 348, a plurality of bearings 350, a second magnetic platter 352, a central annular bushing 354, a lower retention disc 356, an upper retention disc 358, a spindle assembly 360, a bearing platter 362, a lower annular bushing 364, a bottom retention plate 366, and a cleat engagement block 368. The body 346 includes a platter holder 370, an internal protrusion 372, and a stem 374. The body 346 can be unitary in nature such that it is formed from a single piece of material to increase strength and rigidity. As shown in FIG. 23, the back of the retention plate 366 can include texturing 376, e.g., knurling, that allows a user to more securely engage the pedal 314 when they are wearing regular shoes or do not desire to magnetically lock their shoes to the pedal 314.

The platter holder 370 includes an annular sidewall 378, a top opening 380, a bottom opening 382, and a stepped inner annular shoulder 384. The pedal body 346 can also include a bumper guide 342 on an upper edge of the annular sidewall 378, which can act as a front bumper wall that will contact the cleat 312 and prevent a user's foot from sliding forward off of the pedal 314 when they are attempting to engage the cleat 312 with the pedal 314. The bumper guide 342 can be configured to span only a portion of the circumference of the platter holder 370 instead of the entirety. For example, as shown best in FIG. 22, the bumper guide 342 can extend about one-quarter (¼) of the circumference of the platter holder 370, while leaving three-quarters (¾) of the circumference of the platter holder 370 open. Similar to the bumper guide 218 discussed in connection with FIGS. 14-16, the configuration of the bumper guide 342 assists with ease of insertion of the cleat 312 as it allows a user to slide the cleat 312 into the proper position and into engagement with the pedal 314.

The platter holder 370 defines an inner chamber 386 for housing several components of the pedal 314, including, but not limited to, the first magnetic platter 348, the plurality of bearings 350, the second magnetic platter 352, the central annular bushing 354, the lower retention disc 356, the upper retention disk 358, the bearing platter 362, and the lower annular bushing 364. As discussed below, the first magnetic platter 348, the plurality of bearings 350, the second magnetic platter 352, the central annular bushing 354, the lower retention disc 356, the upper retention disk 358, the bearing platter 362, and the lower annular bushing 364 are inserted through the bottom opening 382 of the platter holder 370 and are retained within the inner chamber 386 by the inner annular shoulder 384 and the bottom retention plate 366.

The stem 374 defines an inner chamber 388 with a threaded portion 390, and the internal protrusion 372 defines a bearing channel 392 in communication with the inner chamber 388 of the stem 374. The bearing channel 392 can be generally smaller in diameter than the inner chamber 388. The stem 374 also includes a spindle opening 394 that provides access to the inner chamber 388 and bearing channel 392, thus allowing components of the spindle assembly 360 to be inserted into and positioned therein.

The spindle assembly 360 includes a spindle 396, a bushing 398, a bearing 400, a threaded collar 402, and a nut 404. The threaded collar 402 comprises a threaded end 418 and an enlarged end 420. The threaded end 418 is configured to engage the threaded portion 390 of the stem 374 to removably secure the spindle assembly 360 with the body 346. The enlarged end 420 is formed as a radial collar and can include flattened sides 422 that can be engaged by a wrench or other tool to rotate the threaded collar 402, which assists in securing and tightening the threaded collar 402 with the threaded portion 390 of the stem 374, thereby securely engaging the spindle 396 with the body 346 of the pedal 314. The enlarged end 420 is configured to engage the front face 394 of the stem 374 and prevent the threaded collar 402 from further insertion when the threaded collar 402 is fully engaged with the stem 374.

The spindle 396 comprises a series of concentric components including a keyed head 406, a stop/spacer 410, a bushing mount 412, a bearing mount 414, and a threaded shaft 416. The keyed head 406 extends outwardly from the stop/spacer 410 and is therefore positioned at the outer end of the spindle 396. The keyed head 406 can be engaged by a wrench or other tool to rotate the spindle 396, which assists in securing and tightening the threaded shaft 416 with the nut 404. The keyed head 406 can also include threading (not shown) on the exterior cylindrical surface thereof, e.g., %6"×20 tpi, configured to removably engage a threaded hole of a bicycle crankset crank arm. The stop/spacer 410 is a cylindrical component that extends opposite the keyed head 406. The stop/spacer 410 is configured to engage a front face of the threaded collar 402 and prevent the spindle 396 from further insertion when the spindle 396 is inserted therein.

The bushing mount 412 is cylindrical in shape and extends from the stop/spacer 410 on the opposite side of the keyed head 406. The bushing mount 412 has a smaller diameter than the stop/spacer 410 and is configured to be inserted into and surrounded by the bushing 398. That is, the bushing mount 412 is inserted into the bushing 398 and the bushing 398 is secured to the bushing mount 412, e.g., through a friction fit. The bearing mount 414 is also cylindrical in shape and extends from the bushing mount 412 on the opposite side of the stop/spacer 410. The bearing mount 414 has a smaller diameter than the bushing mount 412 and is configured to be inserted into and surround by the bearing 400. That is, the bearing mount 414 is inserted into the bearing 400 and the bearing 400 is secured to the bearing mount 414, e.g., through a friction fit. The threaded shaft 416 is also cylindrical in shape and extends from the bearing mount 414 on the opposite side of the bushing mount 412. The threaded shaft 416 includes threads that are configured to be engaged by the nut 404 to secure the threaded collar 402, bushing 398, and bearing 400 on the spindle 396.

The bushing 398 is configured to be inserted into and secured between the bushing mount 412 and an interior of the threaded collar 402, which is, in turn, engaged with the threaded portion 390 of the stem 374. The bushing 398 can be made of brass and reduces friction between the spindle 396 and the threaded collar 402. As discussed, the bushing 398 is configured to receive and engage the bushing mount 412 of the spindle 396. The bearing 400 is configured to be inserted into and secured within the bearing channel 392 of the interior protrusion 372. The bearing 400 can be a needle roller bearing that allows a component on the interior thereof, e.g., the bearing mount 414 and therefore the spindle 396, to rotate while an outer ring of the bearing 400 is rotationally constrained. As discussed, the bearing 400 is configured to receive and engage the bearing mount 414 of the spindle 396 such that the spindle 396 can rotate within the bearing 400. When the bushing 398 has received the bushing mount 412, the threaded collar 402 has received the bushing 398, and the bearing 400 has received the bearing mount 414, the nut 404 can then be placed over and engaged with the threaded shaft 416, securing the components of the spindle assembly 360 together. The nut 404 can be engaged by a tool, e.g., a wrench, and the keyed head 406 can be engaged by a separate tool to tighten the nut 404 onto the threaded shaft 416 of the spindle 396. The spindle assembly 360 can then be inserted through the spindle opening 394 and the threaded collar 402 can be rotatably engaged with the threaded portion 390 of the stem 374 until the stop/spacer 410 contacts the front face 394 of the stem 374. When the spindle assembly 360 is fully inserted, the bearing mount 414 is surrounded by the bearing 400, the bearing 400 and the nut 404 are located within and surrounded by the bearing channel 392, and the threaded collar 402 is secured to the threaded portion 390 within the stem 374.

As discussed, the interior protrusion 372 can be an integrally formed feature of the pedal body 346. For example, the platter holder 370, the internal protrusion 372, and the stem 374 of the pedal body 346 can be formed from (e.g., milled out of) a single block or billet of material, such as, but not limited to, aluminum or an alloy thereof, titanium or an alloy thereof, or a steel alloy. The pedal body 346 can also be formed through a casting process, a sintering process, a 3-D printing process, or another process known to those of skill in the art for forming unitary metal components. Additionally, it is noted that the spindle assembly 360, at least partially, extends into an interior of the platter holder 370, as the bearing 400 is secured within the bearing channel 392 of the internal protrusion 372, and the bushing 398 is secured within the stem 394 (e.g., between the bushing mount 312 of the spindle 396 and the threaded collar 402). The integral construction of the pedal body 346, in combination with the spindle assembly 360 being, at least partially, secured within the interior of the platter holder 370 provides the pedal 314 with added rigidity and strength, as well as enhanced balance, when compared to a pedal with a spindle assembly that does not extend into an interior thereof. Turning to FIG. 24, a top perspective view of the second magnetic platter 352 is provided. The second magnetic platter 352 can be similar in function to the magnetic platter 48 shown in FIG. 8 and includes a number of similar components as the magnetic platter 48, the entire details of which need not be repeated. The second magnetic platter 352 is generally circular/semi-circular in shape and includes a body 424, which can be formed of a soft magnetic material, e.g., low carbon steel, having a generally annular aperture 426 disposed therethrough, and a central bearing platter 428 having a central hole 430 configured to receive the bushing 354 (see FIG. 21) and an annular recess 432 (not shown) disposed on an underside thereof configured to receive the plurality of bearings 350 (see FIG. 21). A plurality of soft magnetic blocks 434a-o and a plurality of permanent magnet plates 436 are disposed radially within the annular aperture 426 of the body 424. A notch 438 extends inward from the outer perimeter of the soft magnetic body 424 into the central bearing platter 428 and is configured to engage the internal protrusion 372 of the platter holder 370. More specifically, the second magnetic platter 352 is sized and configured to be constrained by the annular sidewall 378 and the internal protrusion 372 of the platter holder 370 when positioned therein. When the second magnetic platter 352 is placed within the platter holder 370, the internal protrusion 372 engages the notch 438 and prevents the second magnetic platter 352 from rotating within the platter holder 370.

The plurality of permanent magnet plates 436 are positioned radially within the aperture 426 of the soft magnetic body 424 in a direction extending from the central hole 430 to the outer perimeter of the soft magnetic body 424 and are spaced from adjacent permanent magnet plates 436 by an angle α with the soft magnet blocks 434a-o positioned therebetween. The embodiment shown in FIG. 24 has fourteen (14) permanent magnet plates 436, thirteen (13) equally sized soft magnet blocks 434a-m, and two (2) soft magnetic blocks 434n, 434o positioned adjacent to the notch 438 and having a reduced width to accommodate the notch 438. The soft magnetic blocks 434a-o can be described as circular sector prisms in shape. The permanent magnet plates 436 are substantially similar in construction to, and perform substantially the same function as, the permanent magnet plates 124, shown and described in connection with FIGS. 8 and 9, the details of which need not be repeated. Likewise, the soft magnetic blocks 434a-o perform substantially the same function as the soft magnetic blocks 134a-j, shown and described in connection with FIG. 8, the details of which need not be repeated.

Figure 25:
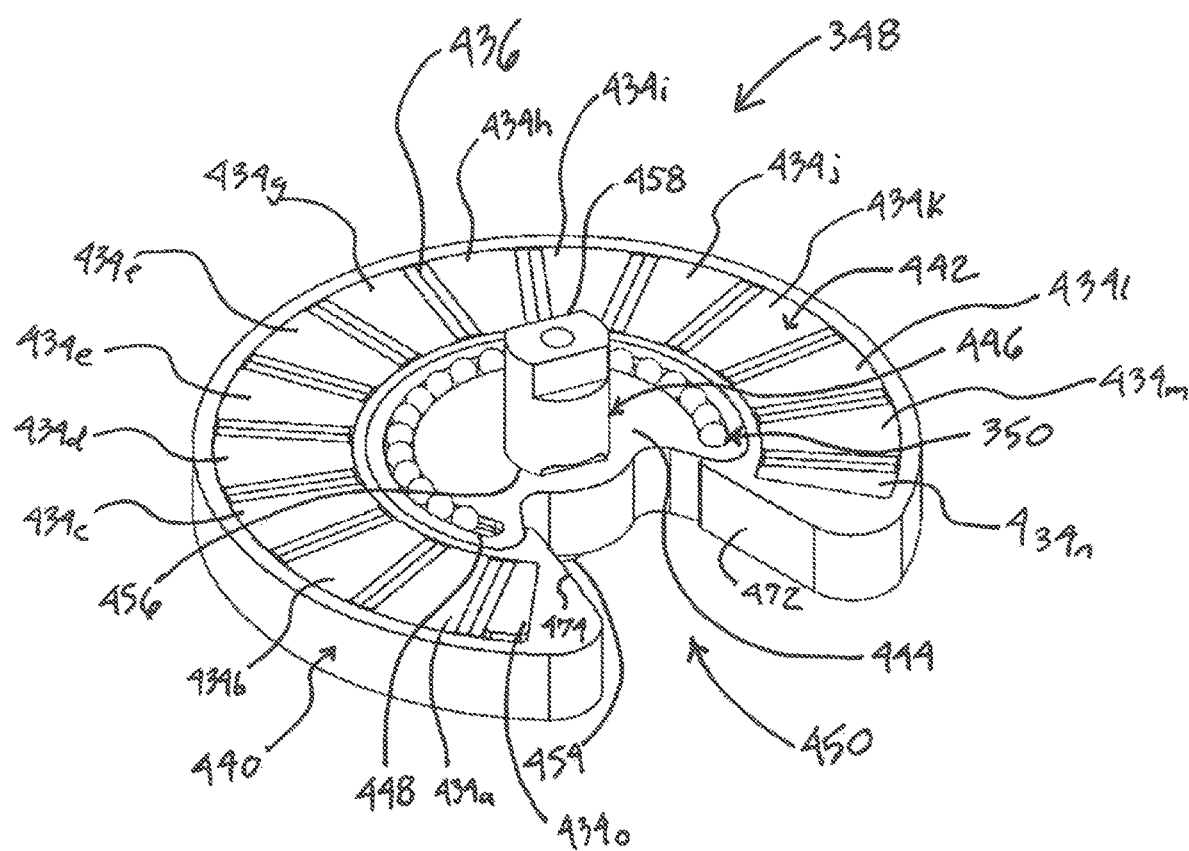
FIG. 25 is a top perspective view of a second magnetic platter of the pedal of FIG. 21

FIG. 25 is a top perspective view of the first magnetic platter 348. The first magnetic platter 348 can be substantially similar in function and construction to the second magnetic platter 352 shown in in FIG. 24 and includes a number of similar components, the entire details of which need not be repeated. The first magnetic platter 348 is generally circular/semi-circular in shape and includes a body 440, which can be formed from the same soft magnetic material as the body 424 of the second magnetic platter 352. The body 440 includes a generally annular aperture 442 disposed therethrough, a central bearing platter 444 with a central spindle 446 and annular recesses 448 disposed on opposing top and bottom sides of the central bearing platter 444, soft magnetic blocks 434, permanent magnetic plates 436, and a notch 450.

The central spindle 446 includes a lower keyed portion 454 configured to be received within a complementary central keyed aperture 456 of the central bearing platter 444, as well as the lower annular bushing 364, shown in FIG. 21, and an upper keyed portion 458 configured to be received within a complimentary keyed recess 452 of the cleat engagement block 368, positioned on an underside thereof. As shown best in FIGS. 21, 24, and 25, the central spindle 446 is configured to be received within each of the upper annular bushing 354 and the lower annular bushing 364, extends through a central aperture 464 of the lower bearing platter 362, extends through the central aperture 430 of the second magnetic platter 352, extends through a central aperture 466 of the lower retention disk 356, extends through a central aperture 468 of the upper retention disk 358, and is seated in a recess 470 of the bottom retention plate 366. It should be understood that the central spindle 446 is free to rotate within the central aperture 430 and with respect to the second magnetic platter 352. However, the keyed engagement between the lower keyed portion 454 of the central spindle 446 and the keyed aperture 456 of the first magnetic platter 348 couples the rotation of the first magnetic platter 348 with the rotation of central spindle 446. Similarly, the keyed engagement between the upper keyed portion 458 of the central spindle 446 and the keyed recess 452 of the cleat engagement block 368 couples the rotation of the central spindle 446 with the rotation of cleat engagement block. Accordingly, when the cleat engagement block 368 is rotated with respect to the pedal body 346 (e.g., by way of engagement with the cleat 312 and rotation thereof by a user), the first magnetic platter 348 is similarly rotated with respect to the second magnetic platter 352. It should also be understood that the central spindle 446 extends substantially the entire height of the pedal 314, e.g., from the bottom retention plate 366 to the cleat engagement block 368, when assembled, thereby providing for even weight distribution of the pedal 314, such that the pedal 314 can freely rotate about the spindle 360 and is not biased in any particular rotational orientation. The central spindle 446 can be constructed of stainless steel, for example.

The notch 450 of the first magnetic platter 348 extends radially inward from the outer perimeter of the body 440 to the central bearing platter 444 and includes first and second sidewalls 472, 474 configured to engage the internal protrusion 372 of the platter holder 370. As shown best in FIG. 21, the notch 450 is larger, e.g., has a greater circumferential length or width, than the internal protrusion 372 and is configured to allow only one of the first and second sidewalls 472, 474 to contact the internal protrusion 372 at a time when the first magnetic platter 348 is positioned within the platter holder 370 and rotated about the central axis of the central spindle 446. More specifically, when the first magnetic platter 348 is rotated in a first direction, e.g., clockwise, the first magnetic platter 348 is permitted to rotate until the first sidewall 472 contacts the internal protrusion 372 and when the first magnetic platter 348 is rotated in a second direction opposite the first direction, e.g., counter-clockwise, the first magnetic platter 348 is permitted to rotate until the second sidewall 474 contacts the internal protrusion 372. Thus, the rotational movement of the first magnetic platter 348 is limited by the width of the notch 450 and the width of the internal protrusion 372. In general, the first magnetic platter 348 is permitted to rotate by angle α so as to activate and deactivate the magnetic circuit, and the notch 450 and internal protrusion 372 are sized and designed accordingly.

More specifically, continued rotation of the first magnetic platter 348 in either direction results in the internal protrusion 372 being contacted by one of the sidewalls 472, 474, which prevents the first magnetic platter 348 from further rotation, and, thus the sidewalls 472, 474 set the angular rotation of the first magnetic platter 348. Accordingly, the sidewalls 472, 474 and the internal protrusion 372 are sized and spaced so that the first magnetic platter 348 can only be rotated by angle α, e.g., the angle that the permanent magnet plates 436 are from adjacent permanent magnet plates 436, as discussed in connection with FIG. 24. Any attempt to rotate the first magnetic platter 348 further is prevented by the sidewalls 472, 474 engaging the internal protrusion 372. Therefore, the sidewalls 472, 474 can be configured to only allow 20° of rotation (e.g., for 14 plates as configured in FIGS. 24 and 25), etc., depending on the number of permanent magnet plates 436. This configuration allows the first magnetic platter 348 to be rotated between a first position (e.g., an unaligned magnetically inactive position) and a second position (e.g., an aligned magnetically active position). It should be understood that the first magnetic platter 348 and the second magnetic platter 352 are magnetically activated and deactivated in a similar manner as the first magnetic platter 48 and the second magnetic platter 52, discussed in connection with FIGS. 10A-11B. In one contemplated embodiment, the first magnetic platter 348 and the second magnetic platter 352 each include fourteen (14) permanent magnet plates 436, which have a rotational angle of 20° for activation and deactivation.

The annular recesses 448 located on opposing top and bottom sides of the central bearing platter 444 of the first magnetic platter 348 are each configured to receive one or more of the plurality of bearings 350 to reduce rotational friction between adjacent components. Specifically, a first plurality of the bearings 350 disposed within the annular recess 448 on the top side of the central bearing platter 444 is also received within the annular recess 432 on the bottom side of the second magnetic platter 424 and a second plurality of the bearings 350 disposed within the annular recess 448 on the bottom side of the central bearing platter 444 are received within an annular recess 460 of the lower bearing platter 362, shown in FIG. 21. Similar to the second magnetic platter 352, the lower bearing platter 362 is also provided with a notch 462 configured to mate with the internal protrusion 372 of the platter holder 370, thereby preventing any rotational movement of the lower bearing platter 362 within the platter holder 370 when the pedal 314 is fully assembled. As such, the first magnetic platter 348 can be axially rotated about the central axis of the central spindle 446 between the first position (e.g., an unaligned magnetically inactive position) and the second position (e.g., an aligned magnetically active position) with minimal rotational resistance, while still being secured between the fixed lower bearing platter 362 and the fixed second magnetic platter 352 when the pedal 314 is fully assembled. The bearings 350 can be, for example, ball bearings.

Referring back to FIG. 21, the cleat engagement block 368 has a matching exterior shape to that of the keyed recess 324 of the cleat 312 so that it can be inserted into and received by the keyed recess 324. The keyed recess 452 of the cleat engagement block 368 receives the upper keyed portion 458 of the central spindle 446, and the cleat engagement block 368 can be coupled to the central spindle 446 by a bolt 486, or other fixation device. This keyed or mating configuration allows the cleat 312 to rotate the first magnetic platter 348 relative to the second magnetic platter 352 when the cleat engagement block 368 is received by the keyed recess 324 and the cleat 312 is rotated. The cleat engagement block 368 is shown with a substantially rectangular configuration, though it is contemplated by the present disclosure that the cleat engagement block 368 and keyed recess 324 could have any matching geometry that allows the cleat 312 to rotate the first magnetic platter 348 when the cleat engagement block 368 is received by the keyed recess 324. For example, the cleat engagement block 368 and the keyed recess 324 could be triangular, pentagonal, star-shaped, etc. Additionally, the cleat engagement block can have a height greater than the inner annular shoulder 384 of the platter holder 70 so that it extends above the platter holder 370 creating a protuberance for a user to locate with the cleat 312, which can assist with connecting the cleat 312 to the pedal 314.

With continuing reference to FIG. 21, the pedal 314 is assembled by seating the lower bearing platter 362 within an annular recess 476 in the bottom plate 366 sized to receive the bearing platter 362. The lower annular bushing 364 is then inserted into the aperture 464 of the lower bearing plate 362 and the first plurality of the bearings 350 (not shown) are positioned within the annular recess 460 of the lower bearing platter 362. The central spindle 446 of the first magnet platter 348 is then inserted into the lower annular bushing 364 such that the first plurality of the bearings 350 are received within the annular recess 448 on the bottom side of the central bearing platter 444 of the first magnetic platter 348, and the second plurality of the bearings 350 are positioned within the annular recess 448 on the top side of the first magnetic platter 348.

Next, the central annular bushing 354 is positioned over the central spindle 446 of the first magnetic platter 348, and the central spindle 446 and central annular bushing 354 are inserted into the central hole 430 of the second magnetic platter 352 such that the second plurality of the bearings 350 are received within the annular recess 432 (not shown) on the bottom side of the central bearing platter 428 of the second magnetic platter 352 and thus positioned between the central bearing platters 428, 444. The lower retention disc 356 is then placed over the first magnetic platter 348 and the central spindle 446 is inserted into the aperture 466 of the lower retention disc 356. At this point, a notch 478, of the lower retention disc 356, which can be sized to match the internal protrusion 372 of the pedal body 346, and the respective notches 462, 450, 438 of the lower bearing platter 362, the first magnetic platter 348, and the second magnetic platter 352 can be aligned. Next, the respective notches 478, 462, 450, 438 of the lower retention disc 356, lower bearing platter 362, first magnetic platter 348, and second magnetic platter 352 are aligned with the internal aperture 372 of the pedal body 346 and inserted into the pedal body 346 until a bottom edge of the annular wall 378 of the body 346 contacts the bottom retention plate 366 and the lower retention disc 356 engages the stepped inner annular shoulder 384 of the body 346. The bottom retention plate 366 can then be secured to the body 346 by a plurality of fasteners 484, thus securing the lower retention disc 356, lower bearing platter 362, first magnetic platter 348, and second magnetic platter 352 within the body 346. Alternatively, the bottom retention plate 366 can be connected to the body 346 by way of an interference/press fit, thus eliminating the need for the fasteners 484. It is noted that when the pedal 314 is fully assembled, a top surface 480 of the lower retention disc 356 is substantially coplanar (e.g., flush) with a top surface 482 of the internal protrusion 372.

The upper retention disc 358 is then placed over the lower retention disc 356 and the central spindle 446 is inserted into the central aperture 468 thereof until the upper retention disc 358 contacts the lower retention disk 358 and is positioned within the top opening 380 of the pedal body 346. The upper retention disk 358 prevents dirt and other debris from entering the interior of the pedal 314 and also reduces rotational friction when the cleat 312 is used to move the first magnetic platter 348 between the magnetically activated and deactivated positions. It is noted that the upper and lower retention discs 358, 356 can be sized and configured to each engage a respective step of the stepped inner annular shoulder 384, with the lower retention disc 356 having a larger diameter being substantially equal to the interior diameter of the annular wall 378 of the pedal body 346 and the upper retention disc 358 having a diameter substantially equal to that of the top opening 380 such that it can fit therein. Lastly, the keyed recess 452 of the cleat engagement block 368 is positioned on the upper keyed portion 458 of the central spindle 446 and removable engaged therewith by way of the bolt 486, or other fixation device.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A pedal for a bicycle, comprising:
   a body including a platter holder defining an interior chamber and an internal protrusion extending into the interior chamber;
   a spindle assembly rotatably secured to the body and configured to be connected to said bicycle, at least a portion of the spindle assembly extending into the internal protrusion;
   a first magnetic platter positioned and rotatably secured within the interior chamber;
   a second magnetic platter positioned and non-rotatably secured within the interior chamber overlaying the first magnetic platter; and
   a central keyed spindle coupled to the first magnetic platter, the central keyed spindle configured to be engaged by a ferrous metal cleat to rotate the first magnetic platter between a first position and a second position;
   wherein when in the first position the pedal is in a magnetically inactive state, and when in the second position the pedal is in a magnetically active state and magnetically secures the cleat to the pedal.

2. The pedal of claim 1, wherein the spindle assembly includes one or more of a spindle, a bearing, a bushing, and a threaded collar.

3. The pedal of claim 1, wherein the body comprises a stem having a threaded opening for removably engaging a threaded collar of the spindle assembly.

4. The pedal of claim 3, wherein the stem is positioned adjacent the internal protrusion and the internal protrusion includes a channel disposed therein, the channel being in communication with the threaded opening of the stem.

5. The pedal of claim 4, wherein the at least a portion of the spindle assembly extends into the internal protrusion when the threaded collar of the spindle assembly is engaged with the threaded opening of the stem such that the spindle assembly and body are rigidly coupled.

6. The pedal of claim 5, wherein the spindle assembly includes a bearing, a bushing, and a spindle.

7. The pedal of claim 6, wherein the bearing and the bushing are positioned about the spindle, the bearing being secured within the internal protrusion and the bushing being secured between the spindle and the threaded collar such that the spindle assembly and body are rigidly coupled.

8. The pedal of claim 1, wherein the second magnetic platter includes a notch disposed therethrough, the notch configured to mate with the internal protrusion and prohibit rotational movement of the second magnetic platter.

9. The pedal of claim 1, wherein the first magnetic platter includes a notch disposed therethrough, the notch configured to engage the internal protrusion and limit rotational movement of the first magnetic platter between the first and second positions.

10. The pedal of claim 9, wherein the notch is configured to limit rotational movement of the first magnetic platter to less than or equal to 36 degrees.

11. The pedal of claim 1, wherein an integral annular shoulder disposed about an upper edge of the platter holder constrains movement of the first and second magnetic platters within the interior chamber in a first vertical direction and a retention plate coupled about a lower edge of the platter holder constrains movement of the first and second magnetic platters within the interior chamber in a second vertical direction opposite the first vertical direction.

12. The pedal of claim 1, wherein a cleat engagement block coupled to the central keyed spindle is configured to be received by a keyed recess of the ferrous metal cleat and rotated by the ferrous metal cleat between the first and the second positions.

13. The pedal of claim 1, wherein the first magnetic platter includes a first magnetic block, a second magnetic block, and a first permanent magnet plate positioned between and separating the first and second magnetic blocks, the first permanent magnet plate magnetizing the first magnetic block with a magnetic north polarity and the second magnetic block with a magnetic south polarity.

14. The pedal of claim 13, wherein the second magnetic platter includes a third magnetic block, a fourth magnetic block, a second permanent magnet plate positioned between and separating the third and fourth magnetic blocks, the second permanent magnet plate magnetizing the third magnetic block with a magnetic north polarity and the fourth magnetic block with a magnetic south polarity.

15. The pedal of claim 14, wherein when in the second position the third magnetic block overlays the first magnetic block and the fourth magnetic block overlays the second magnetic block placing the pedal in the magnetically active state.

16. A pedal for a bicycle, comprising:
   a body including a platter holder and an internal protrusion, the platter holder defining an interior chamber;
   a spindle assembly rotatably secured to the body and configured to be connected to said bicycle;
   a first magnetic platter positioned and rotatably secured within the interior chamber; and
   a second magnetic platter positioned and non-rotatably secured within the interior chamber overlaying the first magnetic platter, the second magnetic platter including a notch configured to mate with the internal protrusion and prohibit rotational movement of the second magnetic platter;

wherein the first magnetic platter is configured to be rotated by a ferrous metal cleat between a first position and a second position, and the first magnetic platter includes a notch configured to engage the internal protrusion and limit rotational movement of the first magnetic platter between a first position and a second position, and wherein when in the first position the pedal is in a magnetically inactive state, and when in the second position the pedal is in a magnetically active state and magnetically secures the cleat to the pedal.

17. The pedal of claim 16, wherein the internal protrusion extends into the interior chamber, and at least a portion of the spindle assembly extends into the internal protrusion.

18. The pedal of claim 17, wherein the body comprises a stem having a threaded opening for removably engaging a threaded collar of the spindle assembly.

19. The pedal of claim 18, wherein the at least a portion of the spindle assembly extends into the internal protrusion when the threaded collar of the spindle assembly is engaged with the threaded opening of the stem such that the spindle assembly and body are rigidly coupled.

20. A pedal for a bicycle, comprising:
a body including a platter holder defining an interior chamber, an internal protrusion extending into the interior chamber, and a stem having a threaded opening;
a spindle assembly including a threaded collar for removably engaging the threaded opening of the stem, the spindle assembly being (i) rotatably secured to the body with at least a portion of the spindle assembly extending into the internal protrusion and (ii) configured to be connected to said bicycle;
a first magnetic platter positioned and rotatably secured within the interior chamber; and
a second magnetic platter positioned and non-rotatably secured within the interior chamber overlaying the first magnetic platter;
wherein the first magnetic platter is configured to be rotated by a ferrous metal cleat between a first position and a second position, and
wherein when in the first position the pedal is in a magnetically inactive state, and when in the second position the pedal is in a magnetically active state and magnetically secures the cleat to the pedal.

21. The pedal of claim 20, wherein the at least a portion of the spindle assembly extends into the internal protrusion when the threaded collar of the spindle assembly is engaged with the threaded opening of the stem such that the spindle assembly and body are rigidly coupled.

22. The pedal of claim 20, wherein the second magnetic platter includes a notch disposed therethrough, the notch configured to mate with the internal protrusion and prohibit rotational movement of the second magnetic platter, and wherein the first magnetic platter includes a notch disposed therethrough, the notch configured to engage the internal protrusion and limit rotational movement of the first magnetic platter between the first and second positions.

\* \* \* \* \*